(12) United States Patent
Fukino et al.

(10) Patent No.: US 11,379,094 B2
(45) Date of Patent: Jul. 5, 2022

(54) EMOTION-BASED CONTENT SELECTION METHOD, CONTENT SELECTION DEVICE, AND NON-TRANSITORY COMPUTER-READABLE RECORDING MEDIUM STORING CONTENT SELECTION PROGRAM

(71) Applicant: Panasonic Intellectual Property Management Co., Ltd., Osaka (JP)

(72) Inventors: Miwa Fukino, Tokyo (JP); Hiroki Takeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/893,914

(22) Filed: Jun. 5, 2020

(65) Prior Publication Data

US 2020/0387267 A1 Dec. 10, 2020

Related U.S. Application Data

(60) Provisional application No. 62/858,020, filed on Jun. 6, 2019.

(30) Foreign Application Priority Data

Sep. 30, 2019 (JP) .............................. JP2019-179541

(51) Int. Cl.
  *G06F 3/0482* (2013.01)
  *G06F 3/01* (2006.01)
(52) U.S. Cl.
  CPC ............ *G06F 3/0482* (2013.01); *G06F 3/011* (2013.01); *G06F 2203/011* (2013.01)

(58) Field of Classification Search
  CPC ... G06F 3/0482; G06F 3/011; G06F 2203/011
  See application file for complete search history.

(56) References Cited

U.S. PATENT DOCUMENTS 5,732,232 A * 3/1998 Brush, II ................ G06T 11/00
  715/751
5,822,123 A * 10/1998 Davis ................. H04N 21/4826
  725/43

(Continued)

FOREIGN PATENT DOCUMENTS

| JP | 2011-170690 | 9/2011 |
| JP | 2018-195043 | 12/2018 |

OTHER PUBLICATIONS

Fukino et al., "Coarse-graining time series data: Recurrence plot of recurrence plots and its application for music", Chaos: An Interdisciplinary Journal of Nonlinear Science, 2016, pp. 1-23.

(Continued)

*Primary Examiner* — Daniel W Parcher
(74) *Attorney, Agent, or Firm* — Greenblum & Bernstein, P.L.C.

(57) ABSTRACT

A content selection method using a computer includes: acquiring a plurality of images related to intensities of at least one emotion; displaying the plurality of images in a selectable manner in a display; acquiring an intensity of the at least one emotion to which an image that a user has selected from the plurality of images is related and designating the acquired intensity as a current emotional state that indicates a user's current emotional state; acquiring a target emotional state that indicates an emotional state that the user has set as a target; determining a content to be used to change the current emotional state to the target emotional state; and outputting the content.

9 Claims, 29 Drawing Sheets

(56) References Cited

U.S. PATENT DOCUMENTS

| | | | | |
|---|---|---|---|---|
| 10,091,554 | B1* | 10/2018 | Newell | A61B 5/163 |
| 2011/0144452 | A1* | 6/2011 | Shin | A61B 5/165 |
| | | | | 600/300 |
| 2011/0243453 | A1 | 10/2011 | Kashima et al. | |
| 2015/0127577 | A1* | 5/2015 | Farronato | G06Q 30/0282 |
| | | | | 705/347 |
| 2016/0240214 | A1* | 8/2016 | Dimitriadis | G10L 17/04 |
| 2017/0004260 | A1* | 1/2017 | Moturu | G16H 50/20 |
| 2017/0277330 | A1* | 9/2017 | Bae | G06F 3/01 |
| 2018/0032610 | A1* | 2/2018 | Cameron | G06F 40/284 |
| 2018/0101659 | A1* | 4/2018 | Ninan | G16H 20/70 |
| 2018/0336276 | A1 | 11/2018 | Fukino et al. | |

OTHER PUBLICATIONS

Russell, "A Circumplex Model of Affect", Journal of Personality and Social Psychology, vol. 39, No. 6, 1980, pp. 1161-1178.

\* cited by examiner

FIG.4

| IMAGE ID | FIRST IMAGE FEATURES (HUE) | SECOND IMAGE FEATURES (SATURATION) | THIRD IMAGE FEATURES (LIGHTNESS) | ... | AROUSAL LEVEL | EMOTIONAL VALENCE (LIGHT-DARK) |
|---|---|---|---|---|---|---|
| 0033 | 35° | 83% | 99% | ... | +0.8 | +0.6 |
| 0404 | 70° | 100% | 50% | ... | +0.5 | −0.5 |
| 7788 | 185° | 34% | 100% | ... | +0.1 | +0.8 |

| 1) AROUSAL LEVEL | VERY LOW |—|—|—|—|—|—| VERY HIGH | 6.7 |
| 2) LIGHT-DARK (EMOTIONAL VALENCE) | VERY DARK |—|—|—|—|—|—| VERY LIGHT | 6.4 |
| 3) TENSION | VERY LOW |—|—|—|—|—|—| VERY HIGH | 1.5 |
| 4) COMPLEXITY | VERY SIMPLE |—|—|—|—|—|—| VERY COMPLEX | 1.2 |

IMAGE

FIG.11

| USER ID | COORDINATES (1,1) | COORDINATES (1,2) | COORDINATES (1,3) | ... | COORDINATES (9,9) |
|---|---|---|---|---|---|
| 1 | IMAGE ID 0001 | IMAGE ID 0005 | IMAGE ID 0030 | ... | IMAGE ID1005 |
| 2 | IMAGE ID 0010 | IMAGE ID 0012 | IMAGE ID 0013 | ... | IMAGE ID1018 |
| 3 | IMAGE ID 0003 | IMAGE ID 0005 | IMAGE ID 0025 | ... | IMAGE ID1032 |

FIG.26

| IMAGE ID | FIRST IMAGE FEATURES (HUE) | SECOND IMAGE FEATURES (SATURATION) | THIRD IMAGE FEATURES (LIGHTNESS) | ... | AROUSAL LEVEL | EMOTIONAL VALENCE (LIGHT-DARK) |
|---|---|---|---|---|---|---|
| 0033 | 35° | 83% | 99% | | +0.8 | +0.6 |
| 0404 | 70° | 100% | 50% | ⇧ | +0.5 | −0.5 |
| 7788 | 185° | 34% | 100% | | +0.1 → +0.12 | +0.8 | ns
EMOTION-BASED CONTENT SELECTION METHOD, CONTENT SELECTION DEVICE, AND NON-TRANSITORY COMPUTER-READABLE RECORDING MEDIUM STORING CONTENT SELECTION PROGRAM

FIELD OF THE INVENTION

The present disclosure relates to a technique for selecting contents for use in changing a users emotional state.

BACKGROUND ART

In past years, there has been a content providing method for providing a user with contents for use in changing his/her emotional state.

As an example, Japanese Patent Application Laid-Open No. 2018-195043 discloses a content providing method, in which a target emotional state value indicating an emotional state that a user has set as a target and user's biometric data are acquired. Then, based on this biometric data, a current emotional state value indicating a user's current emotional state is calculated. Moreover, a difference value between the target emotional state value and the current emotional state value is calculated. In accordance with this difference value, a content for use in changing an emotional state is determined, and this content is provided to the user.

As another example, Japanese Patent Application Laid-Open No. 2011-170690 discloses an information processing apparatus. This information processing apparatus analyzes themes for individual image data groups each including a plurality of pieces of image data, based on image information extracted from the image data and, based on the themes, selects combinations of the image data groups and predetermined processes stored in relation to the themes.

In both of the above conventional techniques, however, a user may have a difficulty sensuously selecting his/her emotional state. Also, it may be impossible to easily identify a user's current emotional state from an image selected by the user. Therefore, there is some room for further improvement.

SUMMARY OF THE INVENTION

The present disclosure, which has been made to address problems as described above, aims to provide a technique for enabling a user to sensuously select his/her emotional state and a technique for easily identifying a user's current emotional state from an image selected by the user.

A content selection method according to the present disclosure using a computer includes: acquiring a plurality of images related to intensities of at least one emotion; displaying the plurality of images in a selectable manner in a display; acquiring an intensity of the at least one emotion to which an image that a user has selected from the plurality of images is related and designating the acquired intensity as a current emotional state that indicates a user's current emotional state; acquiring a target emotional state that indicates an emotional state that the user has set as a target; determining a content to be used to change the current emotional state to the target emotional state; and outputting the content.

BRIEF DESCRIPTION OF THE DRAWINGS

FIG. 4 is a diagram illustrating an example of an image database in the present embodiment;

FIG. 11 is a diagram illustrating an example of a display location database in which user IDs are each related to display locations of a plurality of images in the present embodiment;

FIG. 26 is a diagram for use in describing how to compensate for an arousal level, in the present embodiment;

Figure 1:
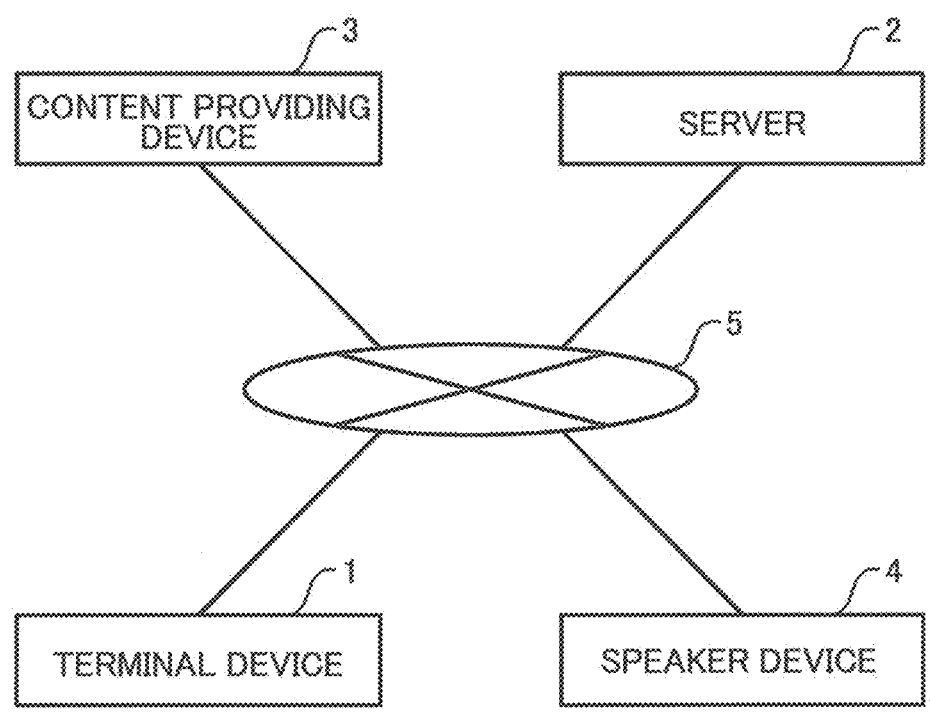
FIG. 1 is a diagram illustrating an example of a configuration of a content providing system according to an embodiment of the present disclosure.

DESCRIPTION OF EMBODIMENT (Knowledge Serving as Basis for the Present Disclosure)

In the technique disclosed in Japanese Patent Application Laid-Open No. 208-195043, the current emotional state value that indicates the user's current emotional state is calculated based on the biometric data. However, a plurality of images that indicate respective emotional states are not provided to the user, and an image that indicates the user's current emotional state is not selected from the plurality of images.

In the technique disclosed in Japanese Patent Application Laid-Open No. 2011-170690, the themes are analyzed for the individual image data groups each including a plurality of pieces of image data, based on image information extracted from the image data. Each theme is represented in features space based on a plurality of characteristic axes each indicating a predetermined evaluation criterion. Examples of the characteristic axes include three axes: a static-dynamic axis, a cute-cool axis, and a rational-emotional axis. The features of each feature axis is expressed as a numerical value.

As described above, in Japanese Unexamined Patent Application Publication No. 2011-170690, the themes of the image data groups are indicated in the features space based on the plurality of feature axes each indicating the predetermined evaluation criterion. However, a plurality of images that indicate respective emotional states are not provided to the user, and an image that indicates the users current emotional state is not selected from the plurality of images.

In both of the above conventional techniques, the user cannot sensuously select his/her emotional state. In addition, the current emotional state is not identified by user's visual perception.

In order to solve the problems described above, according to a first aspect of the present disclosure, a content selection method using a computer includes: acquiring a plurality of images related to intensities of at least one emotion; displaying the plurality of images in a selectable manner in a display; acquiring an intensity of the at least one emotion to which an image that a user has selected from the plurality of images is related and designating the acquired intensity as a current emotional state that indicates a user's current emotional state; acquiring a target emotional state that indicates an emotional state that the user has set as a target; determining a content to be used to change the current emotional state to the target emotional state; and outputting the content.

With the above configuration, an intensity of at least one emotion to which an image that a user has selected from a plurality of images displayed in a display is related is acquired, and then the acquired intensity is designated as a current emotional state that indicates a user's current emotional state. Consequently, it is possible for the user to sensuously select his/her emotional state, and it is also possible to easily identify a user's current emotional state from the image selected by the user.

The above content selection method may further include acquiring user identification information to be used to identify the user. The acquiring of the plurality of images may include acquiring the plurality of images related in advance to the user identification information.

With the above configuration, user identification information to be used to identify the user may be acquired, and the plurality of images related in advance to the user identification information is acquired. Consequently, it is possible to relate intensities of different emotions to the plurality of images for each user, thereby successfully and accurately acquiring an intensity of a user's emotion.

The above content selection method may further include displaying the plurality of images in a selectable manner in the display after the acquiring of the current emotional state has been performed. The acquiring of the target emotional state may include: acquiring an intensity of the at least one emotion to which the image that the user has selected from the plurality of images is related; and designating the acquired intensity as the target emotional state.

With the above configuration, after the current emotional state has been acquired, the user may select one of the plurality of images displayed in the display, and the intensity of the at least one emotion to which the selected image is related may be acquired as the target emotional state. Consequently, it is possible for the user to sensuously select the target emotional state from the plurality of images, and it is also possible to easily identify the user's target emotional state from the image selected by the user.

In the above content selection method, the current emotional state may be expressed as a coordinate value in a coordinate plane with a horizontal axis and a vertical axis representing intensities of respective emotions. The content selection method may further include displaying the coordinate plane in the display together with a coordinate point corresponding to the current emotional state after the acquiring of the current emotional state has been performed. The acquiring of the target emotional state may include acquiring a coordinate value of a coordinate point corresponding to the target emotional state that the user has selected through the coordinate plane and designating the acquired coordinate value as the target emotional state.

With the above configuration, the current emotional state may be expressed as a coordinate value in a coordinate plane with a horizontal axis and a vertical axis representing intensities of respective emotions. After the current emotional state has been acquired, the coordinate plane may be displayed in the display together with a coordinate point corresponding to the current emotional state. Then, a coordinate value of a coordinate point corresponding to the target emotional state that the user has selected through the coordinate plane may be acquired as the target emotional state.

Consequently, the user can easily select his/her target emotional state through the coordinate plane.

In the above content selection method, the displaying of the plurality of images may include displaying a plurality of images related to intensities of a first emotion. The content selection method may further include: measuring a selection time lasting from when the plurality of images are displayed until the image is selected by the user, and displaying, in a selectable manner, a plurality of images related to intensities of a second emotion when the measured selection time is shorter than or equal to a predetermined time, the second emotion differing from the first emotion.

With the above configuration, a selection time may be measured, which lasts from when the plurality of images related to intensities of a first emotion are displayed until the image is selected by the user. When the measured selection time is shorter than or equal to a predetermined time, a plurality of images related to intensities of a second emotion may be displayed in a selectable manner, the second emotion differing from the first emotion.

When the user gets used to selecting an image in accordance with his/her emotion and thus the selection time is shortened, a plurality of images may be displayed to acquire a detailed user's emotion. Consequently, it is possible to acquire an intensity of the user's emotion accurately.

The above content selection method may further include: storing a history of the acquired current emotional state; and assigning a high priority to the intensity of the emotion when a difference between intensities of the emotion in the current emotional state which have been acquired previously and two times before is equal to or greater than a threshold. The displaying of the plurality of images may include sequentially displaying the plurality of images related to intensities of the emotion to which the high priority is assigned.

With the above configuration, when an intensity of the emotion in the current emotional state which has been acquired previously greatly differs from an intensity of the emotion in the current emotional state which has been acquired two times before, the intensity of the emotion may be preferentially acquired. Consequently, it is possible to preferentially acquire an intensity of an emotion which has been greatly changed.

The above content selection method may further include compensating for the acquired current emotional state, based on a current time and features of the selected image.

With the above configuration, the acquired current emotional state may be compensated for based on a current time and features of the selected image. Consequently, it is possible to compensate for the vision, for example, if user's vision for images changes with a time zone.

The above content selection method may further include: acquiring biometric information from the user; and compensating for the acquired current emotional state, based on the acquired biometric information.

With the above configuration, biometric information may be acquired from the user, and based on this biometric information, the acquired current emotional state may be compensated for. Consequently, it is possible to compensate for the vision, for example, if user's vision for images changes with his/her body condition.

According to another aspect of the present disclosure, a content selection device includes: an image acquisition unit that acquires a plurality of images related to intensities of at least one emotion; a display controller that displays the plurality of images in a selectable manner in a display; a current emotional state acquisition unit that acquires an intensity of the at least one emotion to which an image that the user has selected from the plurality of images is related and that designates the acquired intensity as a current emotional state that indicates a user's current emotional state; a target emotional state acquisition unit that acquires a target emotional state that indicates an emotional state that the user has set as a target; a content determination unit that determines a content to be used to change the current emotional state to the target emotional state; and an output unit that outputs the content.

With the above configuration, an intensity of at least one emotion to which an image that a user has selected from a plurality of images displayed in a display is related is acquired, and then the acquired intensity is designated as a current emotional state that indicates a user's current emotional state. Consequently, it is possible for the user to sensuously select his/her emotional state, and it is also possible to easily identify a user's current emotional state from the image selected by the user.

According to another aspect of the present disclosure, a non-transitory computer-readable recording medium that stores a content selection program causes a computer to perform: acquiring a plurality of images related to intensities of at least one emotion; displaying the plurality of images in a selectable manner in a display; acquiring an intensity of the at least one emotion to which an image that a user has selected from the plurality of images is related and designating the acquired intensity as a current emotional state that indicates a user's current emotional state; acquiring a target emotional state that indicates an emotional state that the user has set as a target; determining a content to be used to change the current emotional state to the target emotional state; and outputting the content.

With the above configuration, an intensity of at least one emotion to which an image that a user has selected from a plurality of images displayed in a display is related is acquired, and then the acquired intensity is designated as a current emotional state that indicates a user's current emotional state. Consequently, it is possible for the user to sensuously select his/her emotional state, and it is also possible to easily identify a user's current emotional state from the image selected by the user.

Some embodiments of the present disclosure will be described below with reference to the accompanying drawings. Note that such embodiments are examples for use in implementing the present disclosure and thus are not intended to narrow the technical scope of the present disclosure.

Embodiment

FIG. 1 is a diagram illustrating an example of a configuration of a content providing system according to an embodiment of the present disclosure. The content providing system illustrated in FIG. 1 includes a terminal device 1, a server 2, a content providing device 3, and a speaker device 4.

The terminal device 1, which may be a personal computer, a tablet computer, or a smartphone, for example, is disposed in the space where a user is present.

The server 2 acquires a current emotional state that indicates a user's current emotional state and a target emotional state that indicates an emotional state that the user has set as a target. The terminal device 1 and the server 2 are interconnected so as to be able to communicate with each other via a network 5 such as the Internet.

The content providing device 3, which may be a server including a processor and a memory, for example, provides contents for use in changing the current emotional state to the target emotional state. In the present embodiment, the content providing device 3 provides music contents to the user, as an example of the contents; however, the present disclosure is not particularly limited to this example. Alternatively, the content providing device 3 may provide image contents for use in changing a user's emotional state. Furthermore, the content providing device 3 may provide an illumination content for use in changing the users emotional state by changing an illumination color in the space where the user is present. The server 2 and the content providing device 3 are interconnected so as to be able to communicate with each other via a network 5.

The speaker device 4 is disposed in the space where the user is present. The speaker device 4 outputs music contents received from the content providing device 3. If the content providing system provides the image content to the user, it may include a display device, instead of the speaker device 4. If the content providing system provides the illumination content to the user, it may include an illumination device, instead of the speaker device 4.

Figure 2:
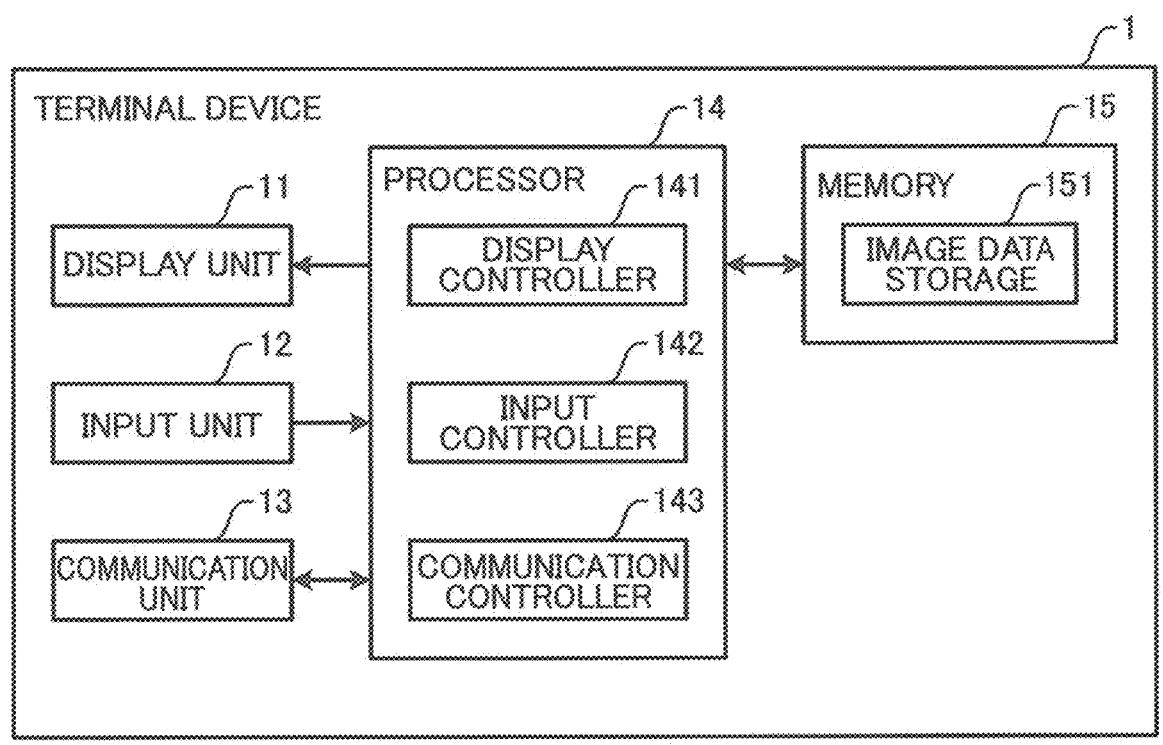
FIG. 2 is a block diagram illustrating an example of a configuration of a terminal device according to the embodiment of the present disclosure.

FIG. 2 is a block diagram illustrating an example of a configuration of the terminal device according to the embodiment of the present disclosure.

The terminal device 1 illustrated in FIG. 2 includes a display unit 11, an input unit 12, a communication unit 13, a processor 14, and a memory 15.

The display unit 11, which may be a liquid crystal display device, for example, displays various pieces of information. The display unit 11 displays a user ID input screen through which the user enters a user ID for use in identifying the user. The display unit 11 displays, in a selectable manner, a plurality of images related to intensities of at least one emotion. The display unit 11 displays a first image selection screen through which the user selects an image indicating the user's current emotional state from the plurality of images. The display unit 11 displays a second image selection screen through which the user selects an image indicating the user's target emotional state from the plurality of images.

The input unit 12, which may be a keyboard, a mouse, or a touch panel display, for example, receives various pieces of information that a user has entered. The input unit 12 receives a user ID that the user has entered. The input unit 12 receives an image indicating the user's current emotional state which the user has selected from the plurality of images. The input unit 12 receives an image indicating the user's target emotional state which the user has selected from the plurality of images.

The communication unit 13 transmits/receives various pieces of information to or from the server 2. The communication unit 13 transmits the user ID received through the input unit 12 to the server 2. The communication unit 13 receives image data containing the plurality of images from the server 2. The communication unit 13 transmits, to the server 2, a first image ID for use in identifying the image indicating the current emotional state that the user has selected. The communication unit 13 transmits, to the server 2, a second image ID for use in identifying the image indicating the target emotional state that the user has selected.

The processor 14, which may be a central processing unit (CPU), for example, includes a display controller 141, an input controller 142, and a communication controller 143.

The display controller 141 controls the display operation of the display unit 11. The display controller 141 causes the display unit 11 to display a user ID input screen over which the user enters the user ID. The display controller 141 causes the display unit 11 to display a plurality of images in a selectable manner. The display controller 141 causes the display unit 11 to display the first image selection screen through which the user selects the image indicating the user's current emotional state from the plurality of images. The display controller 141 causes the display unit 11 to display the second image selection screen through which the user selects the image indicating the user's target emotional state from the plurality of images.

The input controller 142 controls the receiving operation of the input unit 12. The input controller 142 controls the input unit 12 in such a way that it receives a user ID that the user has entered. The input controller 142 controls the input unit 12 in such a way that it receives the image indicating the user's current emotional state that the user has selected from the plurality of images. The input controller 142 controls the input unit 12 in such a way that it receives the image indicating the user's target emotional state that the user has selected from the plurality of images.

The communication controller 143 controls the communication and transmission operations of the communication unit 13. The communication controller 143 controls the communication unit 13 in such a way that it transmits the user ID received through the input unit 12 to the server 2. The communication controller 143 stores the image data received by the communication unit 13 in an image data storage 151 in the memory 15. The communication controller 143 controls the communication unit 13 in such a way it transmits the first image ID selected by the input unit 12 to the server 2. The communication controller 143 controls the communication unit 13 in such a way that it transmits the second image ID selected by the input unit 12 to the server 2.

The memory 15, which may be a semiconductor memory or a hard disk drive, for example, is provided with the image data storage 151.

The image data storage 151 stores the image data received by the communication unit 13.

Figure 3:
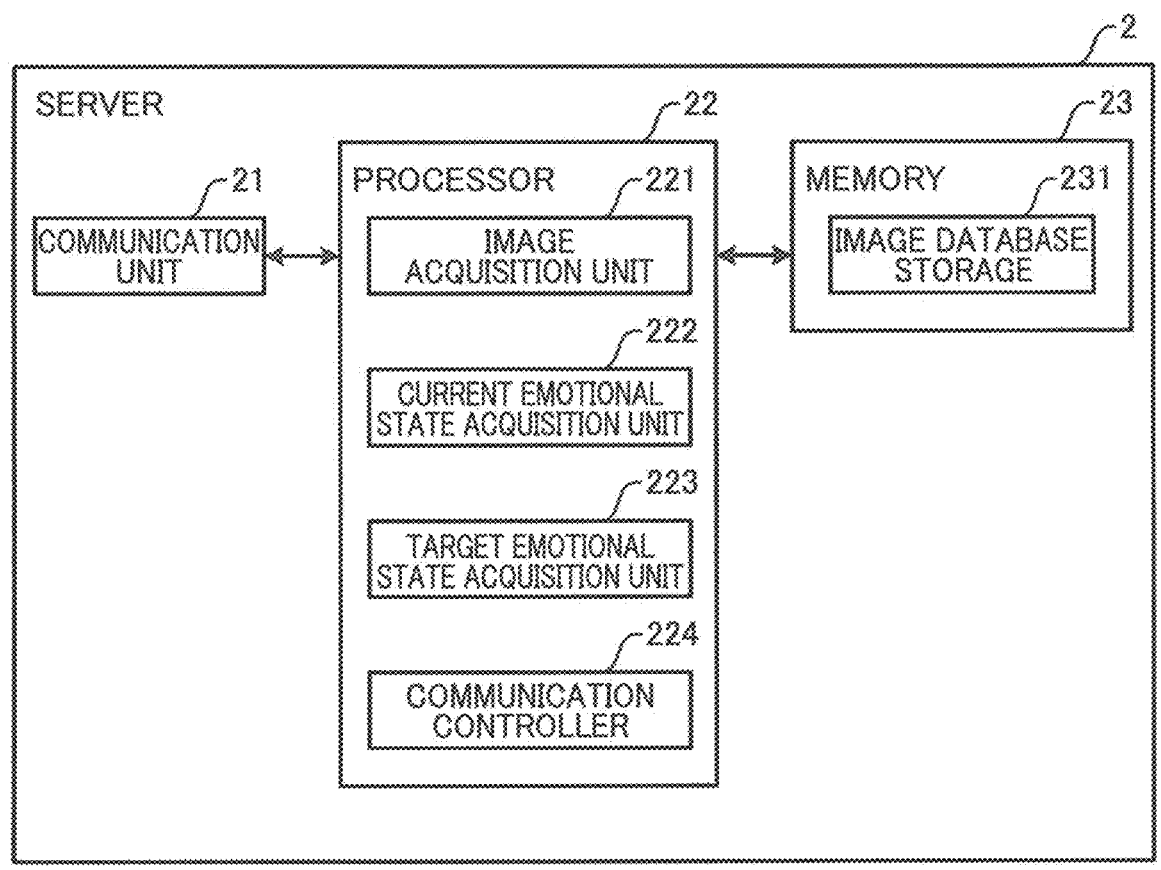
FIG. 3 is a block diagram illustrating an example of a configuration of a server according to the embodiment of the present disclosure.

FIG. 3 is a block diagram illustrating an example of a configuration of the server according to the embodiment of the present disclosure.

The server 2 illustrated in FIG. 3 includes a communication unit 21, a processor 22, and a memory 23.

The communication unit 21 receives the user ID transmitted by the terminal device 1. The communication unit 21 transmits the image data to the terminal device 1. The communication unit 21 receives, from the terminal device 1, the first image ID for use in identifying the image indicating the user's current emotional state. The communication unit 21 receives, from the terminal device 1, the second image ID for use in identifying one image representing the emotional state targeted by the user. The communication unit 21 transmits, to the content providing device 3, the current emotional state that indicates the user's current emotional state and the target emotional state that indicates the user's target emotional state.

The memory 23, which may be a semiconductor memory or a hard disk drive, for example, includes an image database storage 231.

The image database storage 231 stores an image database in which intensities of at least one emotion are related to a plurality of images.

Details of this image database will be described below.

FIG. 4 is a diagram illustrating an example of the image database in the present embodiment.

As illustrated in FIG. 4, in the image database, image IDs for use in identifying images are related to image features (also expressed as image characteristic amounts), and intensities of at least one emotion. The image features include first image features indicating the hue of an image, second image features indicating the saturation of an image, and third image features indicating the lightness of an image.

Note that in the image database, each image ID is related to the image features. For example, if images are stored in an external database, the image related to the image ID in the image database may be acquired from the external database. Furthermore, an image having the same image features as that in the image database may be acquired from the external database.

The intensities of an emotion may be expressed as values of the arousal level and an emotional valence, for example. The current emotional state and the target emotional state are expressed as coordinate values in a coordinate plane with its horizontal and vertical axes representing the intensities of the respective emotions. More specifically, the current emotional state and the target emotional state are expressed as coordinate values at two-dimensional coordinates with its horizontal axis representing the emotional valence and its vertical axis representing the arousal level. Note that the two-dimensional coordinates are based on the Russell's circle diagram (circumplex model of affect)(James A. Russell, "A Circumplex Model of Affect", Journal of Personality and Social Psychology, 1980, Vol. 39, No. 6, 161-1178). The arousal level is expressed as a value ranging from −1.0 (sleepiness) to +1.0 (arousal), whereas the emotional valence is expressed as a value ranging from −1.0 (negative) to +1.0 (positive). The user's emotional state is expressed as the values of the arousal level and the emotional valence.

In the present embodiment, an intensity of an emotion to which an image is related is expressed as the values of the arousal level and the emotional valence; however, the present disclosure is not particularly limited to this aspect. Alternatively, the intensity of the emotion to which an image is related may be at least one of values of the arousal level, the emotional valence, the tension, complexity, and the stress.

The intensity of the emotion may be defined as a dimensionless quantity. For example, a greater value of the arousal level indicates a higher arousal level. The intensity of the emotion may be expressed as positive and negative values, based on a predetermined criterion.

The relationship between the intensity of the emotion and the features of an image will be described below. For example, an image having a greater value of the arousal level contains a larger amount of red component than that of an image having a smaller value of the arousal level. The lightness of an image having a greater value of the emotional valence is higher than that of an image having a smaller value of the emotional valence. An image having a greater value of the tension contains a larger amount of yellow component than that of an image having a smaller value of the tension. An image having a greater value of the complexity contains more colors than those of an image with a smaller value of the complexity. An example of an image having a great value of the complexity may be an image in which curves are drawn at the boundaries of different colors, such as an image with a camouflage pattern. An image expressing a more intense stress has more colors than an image expressing a weaker stress. An example of the image expressing a great value of stress may be an image in which the boundaries of different colors are curved at right angles.

Next, a method of creating an image database will be described below.

An image stored in the image database is related to the intensity of the emotion, based on the features of the image and the result of a questionnaire given to the user, or a measurement of user's biometric information. For example, the intensity of the emotion, such as the arousal level, the emotional valence, the tension, the complexity, or the stress, is related to an image.

The image is provided to the user, and then the user's evaluation of this image is acquired as the result of the questionnaire. The image is thereby related to the intensity of the emotion. For example, a photograph or designed image is provided to the user, and then the questionnaire concerning this image is performed. In this questionnaire, the user evaluates a plurality of emotions expressed by the image on a scale of one to seven. For example, the image may be related to the intensity of the emotion, based on the relationship between the image and the evaluation score of each of the plurality of emotions. In this case, the result of the questionnaire given to one user or an average of the results of the questionnaire to a plurality of users may be used.

Based on the results of questionnaires given to the user concerning some of the plurality of images included in an image set, the intensities of the emotion may be given to the remaining images that are not applied to the user. For example, an estimation model may be learned using an image and users' evaluation results of the image. Then, the intensity of emotion to which an image that is not applied is related may be estimated using this learned estimation model. Alternatively, an estimation model may be learned using a questionnaire result concerning some images and features of those images. Then, the intensity of the emotion to which the other images are related may be estimated using this learned estimation model.

If the measurement of the use's biometric information is used, the relationship between the measurement of the user's biometric information and the intensity of the emotion is referenced and, based on the measurement result, the relationship between the image and the intensity of the emotion is determined. Examples of the biometric information include an electroencephalogram, a pulse wave, and an electrocardiogram.

Figure 5:
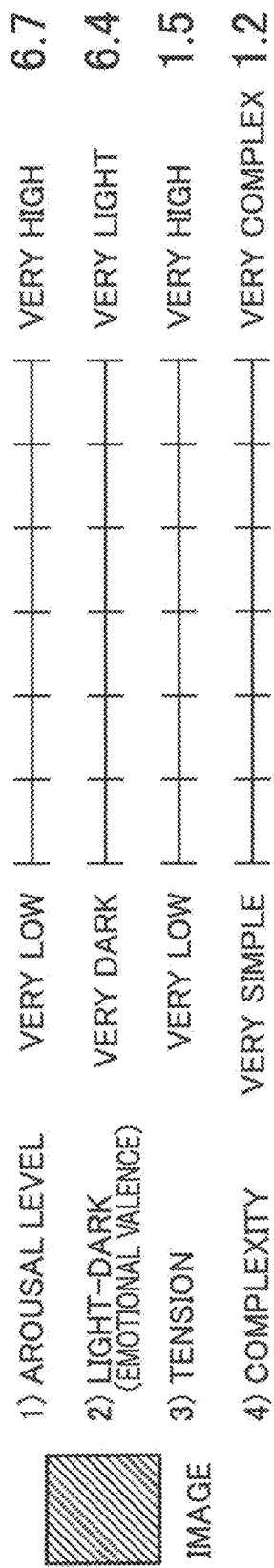
FIG. 5 is a diagram illustrating an example of a questionnaire concerning an image in the present embodiment.

FIG. 5 is a diagram illustrating an example of the questionnaire concerning an image in the present embodiment.

For example, of the plurality of images, one is applied to the user. Then, the user's evaluation of this image is received. The example illustrated in FIG. 5 shows the result of users' questionnaire concerning an image; this result is acquired by averaging the evaluations for items of individual emotions. In the questionnaire illustrated in FIG. 5, four emotions, or the arousal level, the light-dark (emotional valence), the tension, and the complexity, of the image are evaluated. Each emotion is evaluated on a scale of one to seven. In FIG. 5, the evaluation score of the arousal level is 6.7 on the average; the evaluation score of the light-dark (emotional valence) is 6.4 on the average; the evaluation score of the tension is 1.5 on the average; and the evaluation score of the complexity is 1.2 on the average; The average of the evaluation of each emotion is normalized as a value ranging from −1.0 to +1.0 and is related to the image as the intensity of the emotion. For example, in the questionnaire, an evaluation result that is directly related to emotions may be acquired. Alternatively, however, an evaluation result that is close to features of an image such as light-dark (emotional valence) may be acquired, and then the criterion for evaluations of emotions expressed by the other images may be acquired.

For example, only the emotional state of light-dark (emotional valence) may be related to the image. The server 2 may output a music content to the user and acquire a user's emotional state as feedback. If it is possible to determine a music content that is more suitable for the user from an emotional state expressed in the form of the light-dark rather than a user's direct emotional state, the server 2 may acquire the current emotional state and the target emotional state in accordance with the feedback result received after the music content has been output. The emotional state can be acquired based on the information related to the image features, and the music content can be determined.

Figure 6:
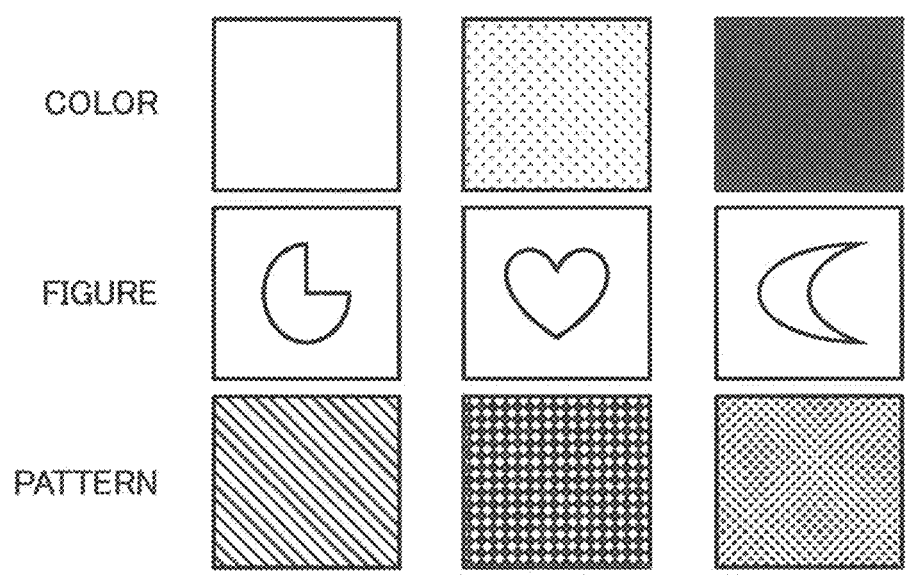
FIG. 6 is a diagram illustrating an example of images to be provided to a user in the present embodiment.

FIG. 6 is a diagram illustrating an example of images to be provided to a user in the present embodiment.

Each of these images may be expressed by at least one of a color, a figure, and a pattern. In FIG. 6, for example, each image expressed by only a color, only a figure, or only a pattern is depicted. Alternatively, each image may be expressed by combining a plurality of elements. In this case, for example, the user has some emotional items that strongly influence the impression of an image. Thus, in accordance with the feedback result received after the music content has been output, the emotional state may be acquired from an image that contains an item of the emotion that strongly influences the impression of the image.

Figure 7:
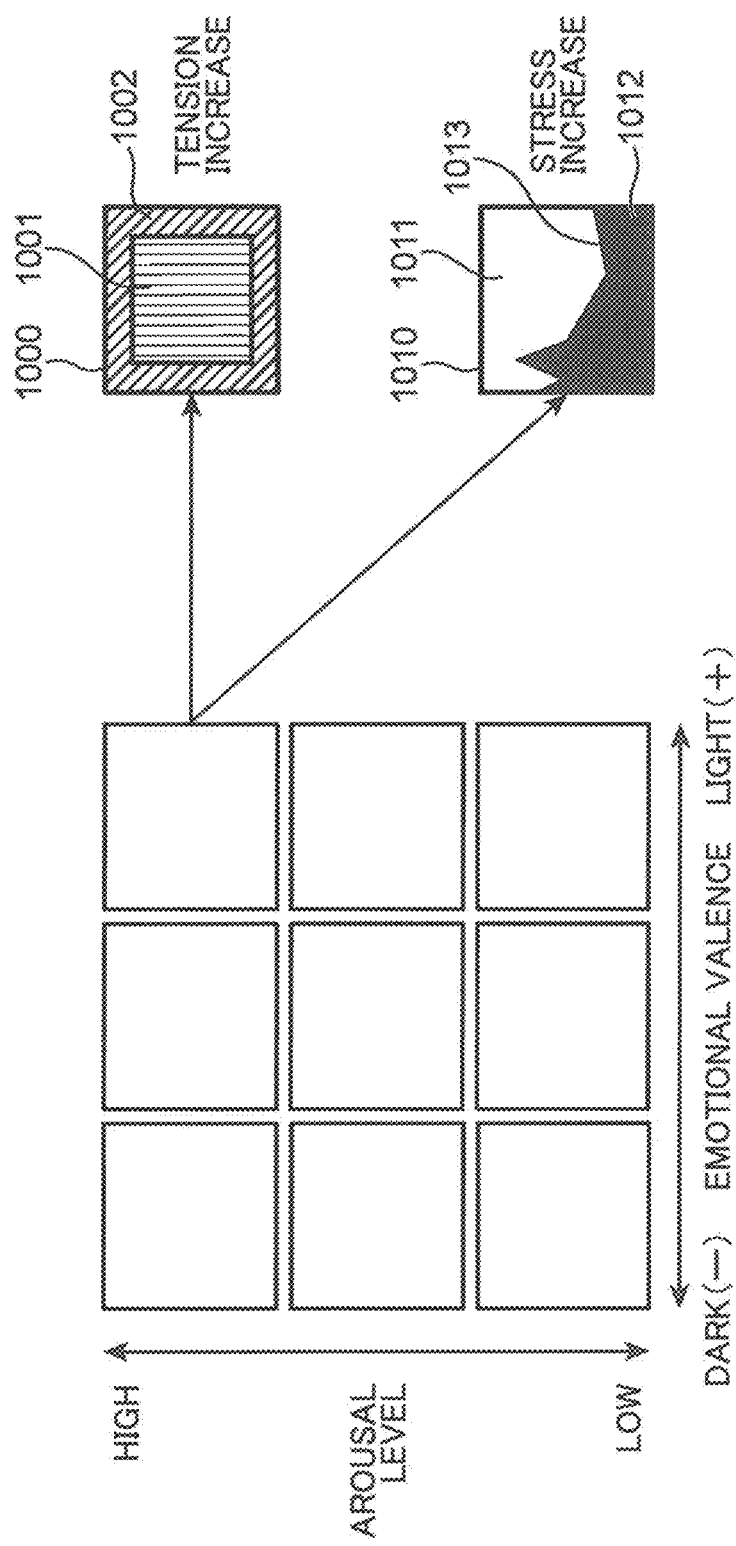
FIG. 7 is a diagram illustrating an example of images related to intensities of a plurality of emotions, in the present embodiment.

FIG. 7 is a diagram illustrating an example of images related to intensities of a plurality of emotions, in the present embodiment.

As illustrated in FIG. 7, a plurality of images are arranged in accordance with the values of the arousal level and the emotional valence in a two-dimensional coordinate plane, with its horizontal axis representing the emotional valence and its vertical axis representing the arousal level. In addition to the arousal level and the emotional valence, the emotion of tension or stress can be related to each image. As an example, if the arousal level, the emotional valence, and the tension are related to each image, an image 1000 may contain a first area 1001 and a second area 1002. The first area 1001 expresses the arousal level and the emotional valence, and the second area 1002 that is in contact with the outer edge of the first area 1001 expresses the tension. The second area 1002 may contain a yellow component that causes the tension to increase. For example, the second area 1002 may contain different amounts of yellow component at different display locations, so that the intensity of the tension varies. The second area 1002 containing a larger amount of yellow component causes the tension to become more intense.

As another example, if the arousal level, the emotional valence, and the stress are related to each image, the image 1010 may contain a first area 1011 with a first color and a second area 1012 with a second color which is different from the first color. The combination of the first area 1011 and the second area 1012 expresses the arousal level and the emotional valence. A boundary 1013 between the first area 1011 and the second area 1012 contains at least one acute-angle part. The number of acute-angle parts expresses how intense the stress is. For example, a different number of acute-angle parts formed in the boundaries 1013 of the images at different display locations can vary the intensity of the stress. A larger number of acute-angle parts of the boundary 1013 causes the stress to become more intense.

The processor 22, which may be a CPU, for example, includes an image acquisition unit 221, a current emotional state acquisition unit 222, a target emotional state acquisition unit 223, and a communication controller 224.

The image acquisition unit 221 acquires a plurality of images related to the intensity of at least one emotion from the image database storage 231. The communication unit 21 transmits image data containing the plurality of images acquired by the image acquisition unit 221 to the terminal device 1.

The current emotional state acquisition unit 222 acquires one of the plurality of images which the user has selected and then designates the intensity of at least one emotion to which the acquired image is related, as the current emotional state, which indicates the user's current emotional state. The current emotional state acquisition unit 222 acquires, from the image database storage 231, the intensity of the emotion related to the first image ID for use in identifying the image representing the user's current emotional state that the communication unit 21 has received and then designates the acquired intensity of the emotion as the current emotional state.

The target emotional state acquisition unit 223 acquires the target emotional state, which indicates the emotional state that the user has set as the target. The target emotional state acquisition unit 223 acquires, from the image database storage 231, the intensity of the emotion related to the second image ID for use in identifying the image representing the user's target emotional state that the communication unit 21 has received, and then designates the acquired intensity of the emotion as the target emotional state.

The communication controller 224 controls the transmission and reception operations of the communication unit 21. The communication controller 224 controls the communication unit 21 in such a way it receives the user ID transmitted by the terminal device 1. The communication controller 224 controls the communication unit 21 in such a way that it transmits the image data to the terminal device 1. The communication controller 224 controls the communication unit 21 in such a way that it receives, from the terminal device 1, the first image ID for use in identifying the image representing the user's current emotional state. The communication controller 224 controls the communication unit 21 in such a way that it receives, from the terminal device 1, the second image ID for use in identifying the image representing the emotional state that the user has set as a target. The communication controller 224 controls the communication unit 21 in such a way that it transmits the current emotional state and the target emotional state to the content providing device 3.

Figure 8:
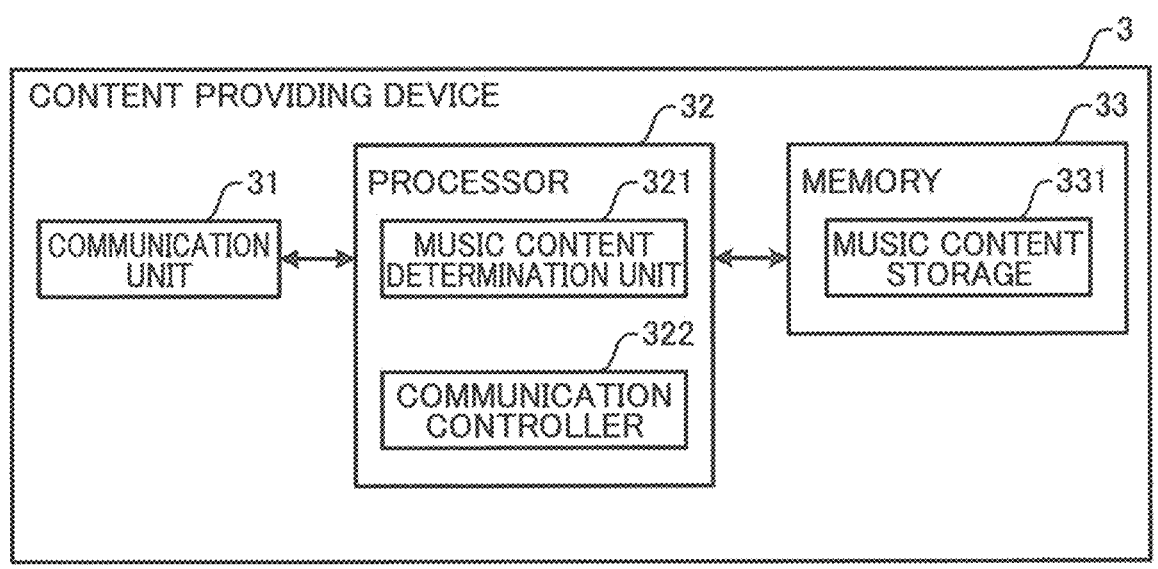
FIG. 8 is a block diagram illustrating an example of a configuration of a content providing device according to the embodiment of the present disclosure.

FIG. 8 is a block diagram illustrating an example of a configuration of the content providing device according to the embodiment of the present disclosure.

The content providing device 3 illustrated in FIG. 8 includes a communication unit 31, a processor 32, and a memory 33.

The communication unit 31 receives the current emotional state and the target emotional state transmitted by the server 2. The communication unit 31 transmits a music content determined by a music content determination unit 321 to the speaker device 4.

The memory 33, which may be a semiconductor memory or a hard disk drive, for example, includes a music content storage 331.

The music content storage 331 stores a plurality of music contents. In addition, the music content storage 331 stores, in relation to each music content, a song ID for use in identifying each music content, a song title, an emotional state change value indicating the difference between the current emotional state and the target emotional state.

The processor 32, which may be a CPU, for example, includes the music content determination unit 321 and a communication controller 322.

The music content determination unit 321 determines which content can change the current emotional state to the target emotional state. In the present embodiment, the contents may be music contents. The music content determination unit 321 calculates the emotional state change value indicating the difference between the current emotional state and the target emotional state that the communication unit 31 has received. The music content determination unit 321 acquires the music content related to the calculated emotional state change value from the music content storage 331.

For example, if both of the arousal level and the emotional valence that indicate the current emotional state are −0.5, and the arousal level and the emotional valence that indicate the target emotional state are +0.3 and +0.6, respectively, the emotional state change value (the differences in the arousal level and the emotional valence) is +0.8 and +1.1. The music content determination unit 321 acquires, from the music content storage 331, the music content related to the emotional state change value, or the difference in the arousal level (+0.8) and the difference in the emotional valence (+1.1).

The communication controller 322 controls the communication unit 31 in such a way that it receives the current emotional state and the target emotional state transmitted by the server 2. The communication controller 322 controls the communication unit 31 in such a way that it transmits the music content determined by the music content determination unit 321 to the speaker device 4.

Figure 9:
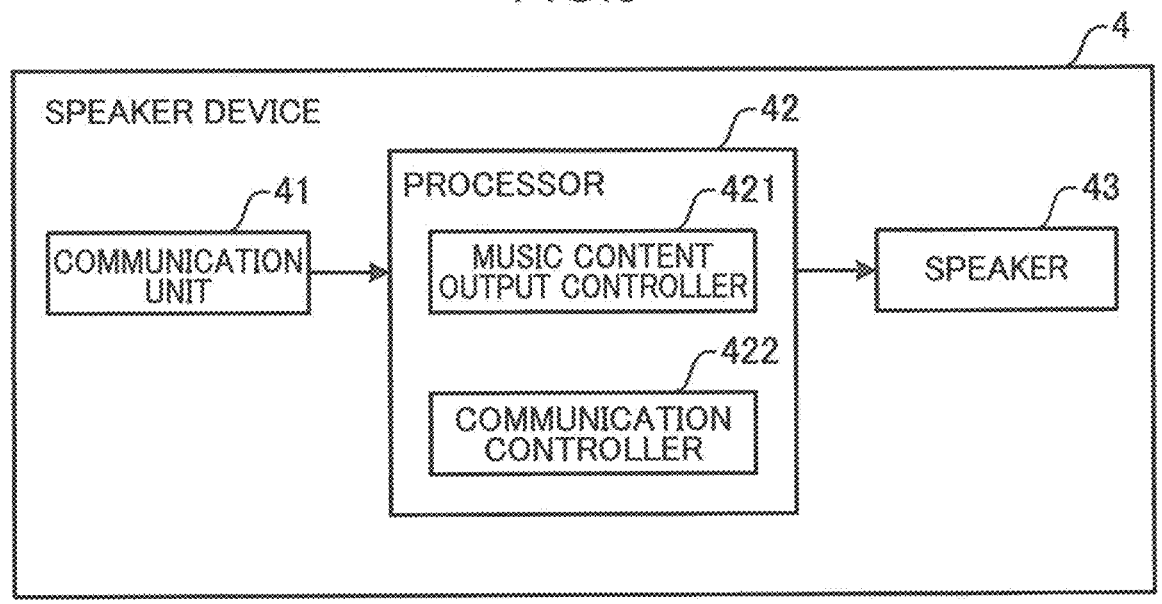
FIG. 9 is a block diagram illustrating an example of a configuration of a speaker device according to the embodiment of the present disclosure.

FIG. 9 is a block diagram illustrating an example of a configuration of the speaker device according to the embodiment of the present disclosure.

The speaker device 4 illustrated in FIG. 9 includes a communication unit 41, a processor 42, and a speaker 43.

The communication unit 41 receives the music content transmitted by the content providing device 3.

The processor 42, which may be a CPU, for example, includes a music content output controller 421 and a communication controller 422.

The music content output controller 421 controls the speaker 43 in such a way that it outputs the music content received by the communication unit 41.

The communication controller 422 controls the communication unit 41 in such a way that it receives the music content transmitted by the content providing device 3.

The speaker 43 outputs the content. In the present embodiment, the contents may be music contents.

Next, the operation of the content providing system in the present embodiment will be described below.

Figure 10:
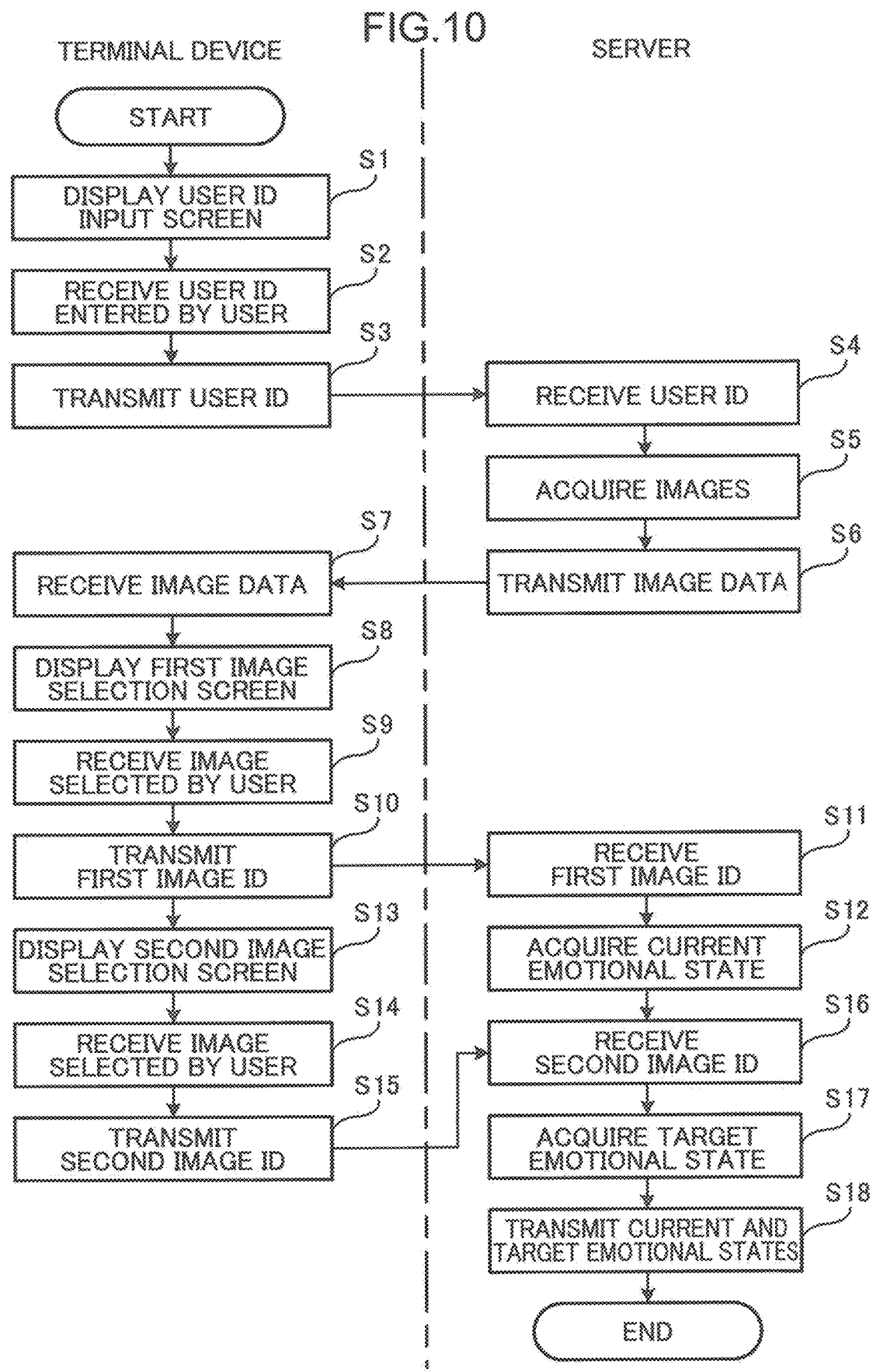
FIG. 10 is a flowchart for use in explaining operations of the terminal device and the server in the present embodiment.

FIG. 10 is a flowchart for use in explaining the operations of the terminal device and the server in the present embodiment.

In step S1, the display unit 11 of the terminal device 1 displays the user ID input screen through which the user enters his/her user ID.

In step S2, the input unit 12 receives the user ID that the user has entered through the user ID input screen displayed in the display unit 11.

In step S3, the communication unit 13 transmits the user ID received from the input unit 12 to the server 2.

In step S4, the communication unit 21 of the server 2 receives the user ID transmitted by the terminal device 1.

In step S5, the image acquisition unit 221 acquires, from the image database storage 231, a plurality of images related to the user ID received by the communication unit 21.

In this case, the plurality of images are related to the user ID in advance. Of the plurality of images related to the user ID, the display locations are determined in advance.

Figure 12:
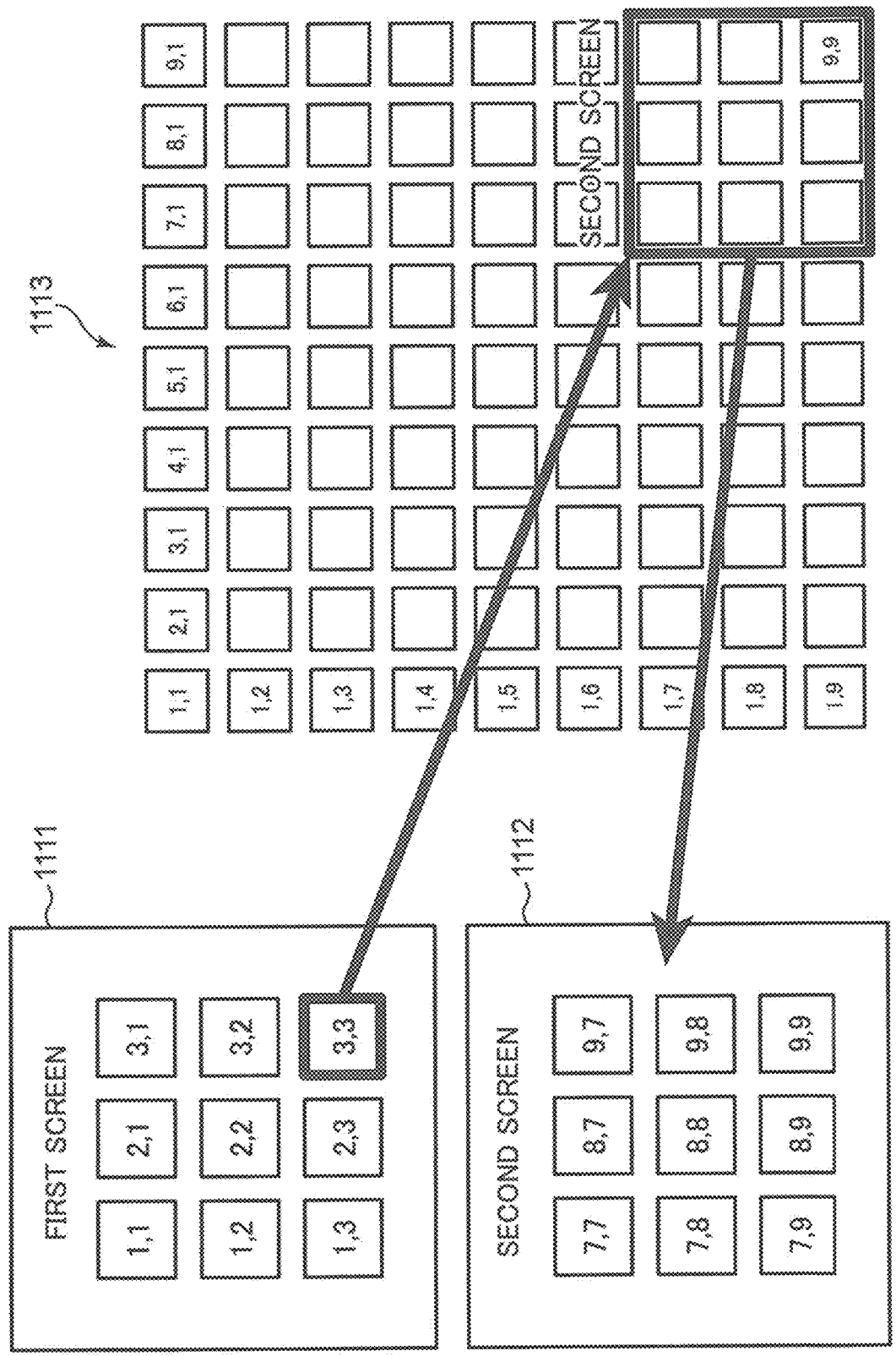
FIG. 12 is a diagram illustrating an example of the display locations of a plurality of images displayed in a display unit of the terminal device in the present embodiment.

FIG. 11 is a diagram illustrating an example of a display location database in which user IDs are each related to display locations of a plurality of images in the present embodiment. FIG. 12 is a diagram illustrating an example of the display locations of a plurality of images displayed in a display unit of the terminal device in the present embodiment.

As illustrated in FIG. 11, in the display location database, each user ID is related in advance to the display locations of the plurality of images. The display location database is stored in the memory 23.

The image acquisition unit 221 acquires the user 1D (user identification information) for use in identifying the user. Then, the image acquisition unit 221 acquires the plurality of images related in advance to the user ID (user identification information). If the display location database is stored, the plurality of images are displayed in the display unit 11 based on the information on the display location for each of the plurality of images contained in the display location database.

As illustrated in FIG. 12, the display unit 11 may allow the user to perform two-stage operations, in other words, to select a mood through a first screen 1111 in a rough manner and to select a mood through a second screen 1112 in detail. In FIG. 12, the first screen 1111 roughly shows an image group 1113. First, the display unit 11 displays the first screen 1111. For example, suppose the user selects the image at the coordinates (3, 3) on the first screen 1111 in FIG. 12. Then, the display unit 11 displays, on the second screen 1112, the nine images that the image group 1113 of FIG. 12 contains at the coordinates (7, 7) to (9, 9). By performing these operations, the user can select an area on emotion axes through the first screen 111 in FIG. 12 and then can reselect this area in more detail.

Alternatively, the images on the first screen 1111 may correspond to images in the upper left one of areas defined by dividing the image group 1113 into nine (3×3) horizontally and vertically. For example, the image on the first screen 1111 at the coordinates (1,1) may correspond to that of the image group 1113 at the coordinates (1, 1). The image on the first screen 1111 at the coordinates (1, 2) may correspond to that of the image group 1113 at the coordinates (1, 4). The image on the first screen 1111 at the coordinates (3, 3) may correspond to that of the image group 1113 at the coordinates (7, 7).

The display unit 11 displays nine (3×3) images as a first image set and receives one image from the first image set. After the image of the first image set has been selected, the display unit 11 further displays nine (3×3) images as a second image set which are related to the selected image. Then, the display unit 11 receives one image from the second image set. In this case, the image database storage 231 stores the first image set and the second image set. In the first image set, the image group 1113 containing the 81 (9×9) images illustrated in FIG. 12 is roughly shown as nine (3×3) images, and in the second image set, the area corresponding to the total area of the images in the first image set is shown as nine (3×3) detailed images. One image in the first image set corresponds to one of the nine images on the first screen at the coordinates (1,1) to (1, 3), (2, 1) to (2, 3), and (3, 1)

to (3, 3). One image in the second image set corresponds to one of the images on the second screen at the coordinates (7, 7) to (9, 9), for example.

Figure 13:
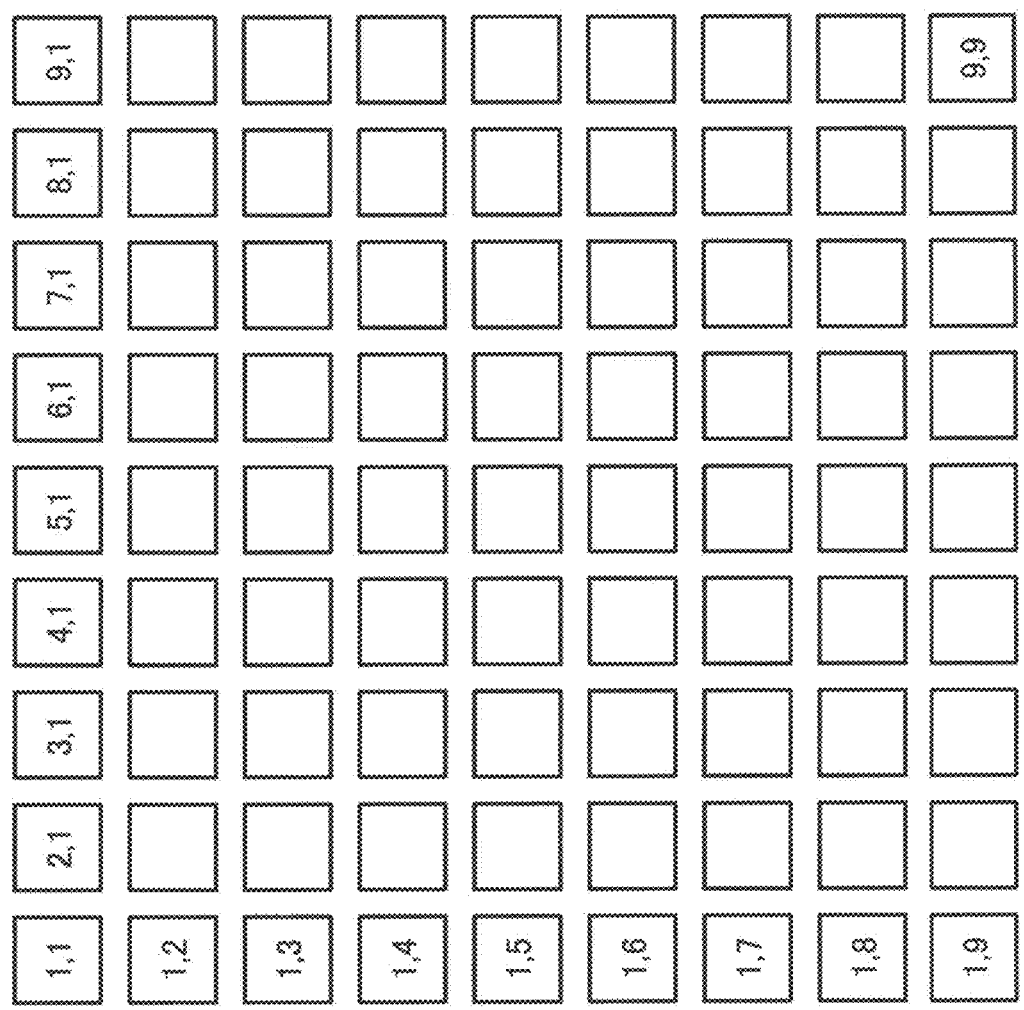
FIG. 13 is a diagram illustrating a first modification of the display locations of the plurality of images displayed in the display unit of the terminal device in the present embodiment.

FIG. 13 is a diagram illustrating a first modification of the display locations of a plurality of images displayed in the display unit of the terminal device in the present embodiment.

As illustrated in FIG. 13, images may be arranged in a 9 by 9 matrix fashion in the display unit 11 of the terminal device 1 in the vertical and horizontal directions. In FIG. 13, the coordinates (1, 1) to (9, 9) indicate the display locations of the respective images.

The display unit 11 may display 81 (9×9) images on a single screen as illustrated in FIG. 13; however, the user may have trouble viewing each image when the screen is excessively small in size. Therefore, the display unit 11 may display only some of the 81 images on the screen in such a way that the user can view them and may further display the remaining images in response to a scrolling operation in the horizontal and vertical directions.

Note that, in the present embodiment, the image database storage 231 stores in advance an image group for each user; however, the present disclosure is not particularly limited to this aspect. Alternatively, the image database storage 231 may store a plurality of image groups for each user. For example, the image acquisition unit 221 acquires one image group from a plurality of image groups, based on information such as a usage time, a usage day (weekday or holiday), or whether another person is present in the usage space. In addition, the terminal device 1 may provide a plurality of emotions to the user, and may receive one of the emotions that the user has selected as the most interesting one. The image acquisition unit 221 may select an image group based on the selected emotion.

As described above, a questionnaire is given in advance to a user who will use the content providing system, and the user ID for use in identifying the user is related in advance to a plurality of images. In this way, it is possible to accurately acquire the current emotional state and target emotional state from the user.

In the present embodiment, the user ID is acquired; however, the present disclosure is not particularly limited to this aspect. The user ID does not necessarily have to be acquired. In this case, the process of receiving the user ID entered by the user is unnecessary, and the display location database in which the user ID is related in advance to a plurality of images does not have to be stored.

If the display location database is not stored, a plurality of images may be displayed in the display unit 11 based on the value indicating the intensity of the emotion to which each of the plurality of images is related.

Figure 14:
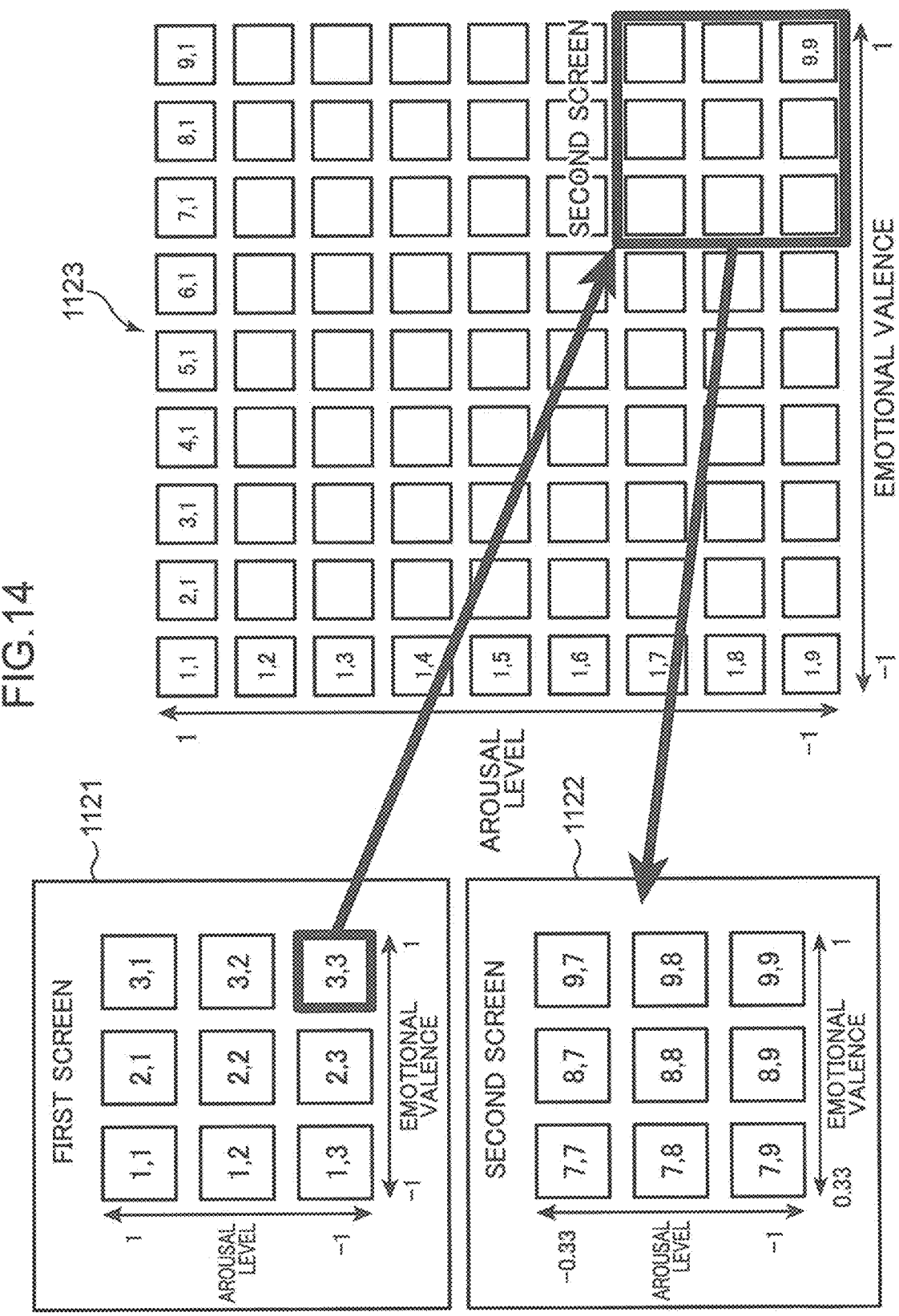
FIG. 14 is a diagram illustrating a second modification of the display locations of the plurality of images displayed in the display unit of the terminal device in the present embodiment.

FIG. 14 is a diagram illustrating a second modification of the display locations of a plurality of images displayed in the display unit of the terminal device in the present embodiment.

For example, the display location may be determined in accordance with the values of the arousal level and the emotional valence, each of which indicates the intensity of the emotion. As illustrated in FIG. 14, in each display screen, the horizontal axis represents the emotional valence, and the vertical axis represents the arousal level. On each display screen, images may be displayed at locations corresponding to individual values.

As illustrated in FIG. 14, the display unit 11 may provide the user with the two-stage operations and may allow the user to select a mood through a first screen 1121 in a rough manner and then to further select a mood through a second screen 1122 in detail. The first screen 1121 in FIG. 14 roughly represents an image group 1123 in FIG. 14. First, the display unit 11 displays the first screen 1121. For example, the user selects the image at the coordinates (3, 3) on the first screen 1121 of FIG. 14. In this case, the display unit 11 displays, on the second screen 1122, nine images out of the images of the image group 1123 in FIG. 14 at the coordinates (7, 7) to the coordinates (9, 9). By performing the operations in this manner, the user can select an area on emotion axes through the first screen 1121 in FIG. 14 and then can reselect this area in detail.

Alternatively, the images on the first screen 1121 may correspond to images in the upper left one of areas defined by dividing the image group 1123 into nine (3×3) horizontally and vertically. For example, the image on the first screen 121 at the coordinates (1, 1) may correspond to that of the image group 1123 at the coordinates (1, 1). The image on the first screen 1121 at the coordinates (1, 2) may correspond to that of the image group 1123 at the coordinates (1, 4). The image on the first screen 1121 at the coordinates (3, 3) may correspond to that of the image group 1123 at the coordinates (7, 7).

The display unit 11 displays nine (3×3) images as the first image set and receives one image from the first image set. After the image has been selected from the first image set, the display unit 11 may display nine (3×3) images as a second image set in relation to the selected image and then may receive one image selected by the user from the second image set. In this case, the image database storage 231 stores the first image set and the second image set. The first image set contains nine (3×3) images created by dividing the image group 1123 in the coordinate plane with its horizontal axis representing the emotional valence and its vertical axis representing the arousal level, and the second image set contains nine (3×3) images created by dividing the area corresponding to the total area of the images in the first image set. One image of the first image set corresponds to one of the nine images on the first screen at the coordinates (1,1) to (1,3), (2,1) to (2,3), and (3,1) to (3,3). One image of the second image set corresponds to one of the images on the second screen at the coordinates (7, 7) to (9, 9), for example.

Figure 15:
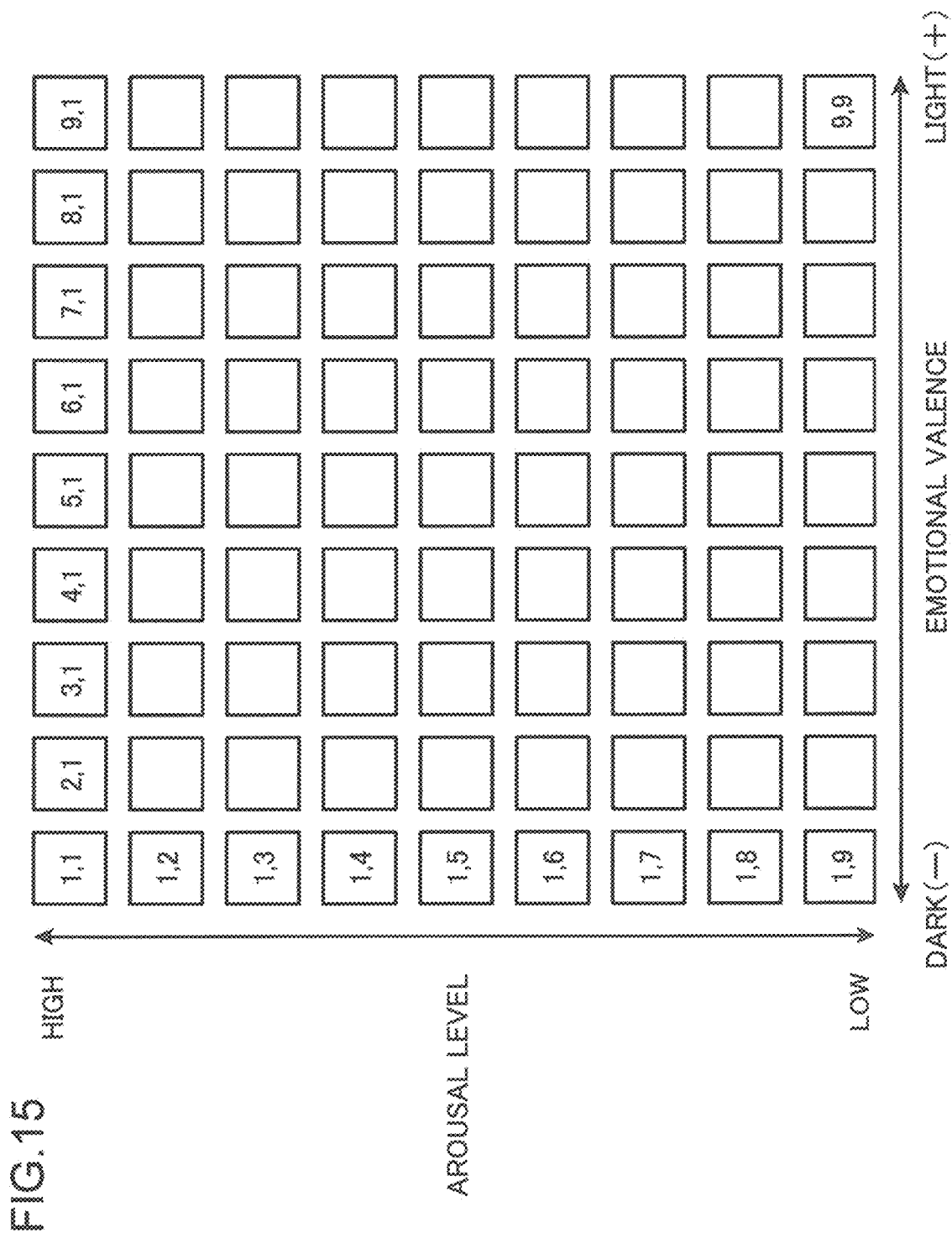
FIG. 15 is a diagram illustrating a third modification of the display locations of the plurality of images displayed in the display unit of the terminal device in the present embodiment.

FIG. 15 is a diagram illustrating a third modification of the display locations of a plurality of images displayed in the display unit of the terminal device in the present embodiment.

As illustrated in FIG. 15, images may be arranged in a 9 by 9 matrix fashion in the display unit 11 of the terminal device 1 in the vertical and horizontal directions. As illustrated in FIG. 15, in the display screen, the horizontal axis represents the emotional valence, and the vertical axis represents the arousal level. On this display screen, images may be displayed at locations corresponding to individual values.

The display unit 11 may display 81 (9×9) images on a single screen as illustrated in FIG. 15; however, the user may have trouble viewing each image when the screen is excessively small in size. Therefore, the display unit 11 may display only some of the 81 images on the screen in such a way that the user can view them and may further display the remaining images in response to a scrolling operation in the horizontal and vertical directions.

Alternatively, instead of displaying 81 (9×9) images illustrated in FIG. 15, the display unit 11 may display a coordinate plane with its horizontal axis representing the emotional valence and its vertical axis representing the arousal level. Then, the display unit 11 may receive a position in the coordinate plane which the user has selected in accordance with his/her current emotional state. After that, the display unit 11 may display nine (3×3) images as an image set, the center of which corresponds to the selected location in the coordinate plane and may receive one of the images of the image sets which the user has selected.

If each image is related to the intensities of two or more emotions, the display controller 141 of the terminal device 1 may select the intensities of two emotions out of the two or more emotions and may display a plurality of images in a two-dimensional manner by using the selected intensities of two emotions. Alternatively, the display controller 141 may display a plurality of images in one- or multiple-dimensional manner, depending on the number of emotions related to each image. It is, however, desirable that the plurality of images be displayed in a two-dimensional manner in terms of user's visibility.

Alternatively, the display controller 141 may display, in a one-dimensional manner, a plurality of images related to the intensity of one emotion out of the two or more emotions and then may receive one image selected by the user. After that, the display controller 141 may display, in a one-dimensional manner, a plurality of images related to the intensity of another emotion out of the two or more emotions and then may receive one image selected by the user.

Figure 16:
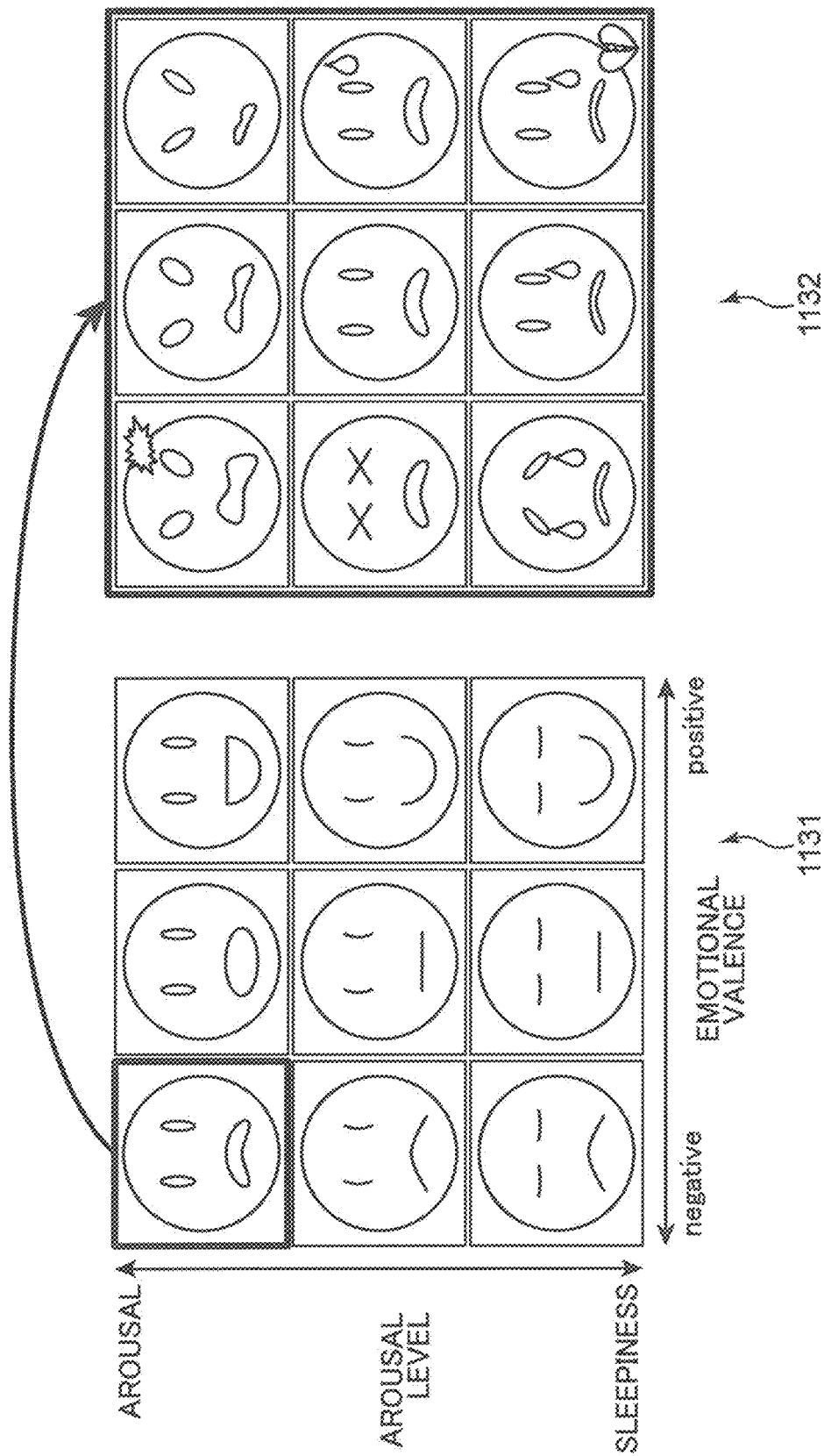
FIG. 16 is a diagram illustrating a fourth modification of the display locations of the plurality of images displayed in the display unit of the terminal device in the present embodiment.

FIG. 16 is a diagram illustrating a fourth modification of the display locations of a plurality of images displayed in the display unit of the terminal device in the present embodiment.

On a first screen 1131 illustrated in FIG. 16, images showing emotions arranged on two axes representing the arousal level and the emotional valence. The horizontal axis represents the emotional valence; the vertical axis represents the arousal level. The first screen 1131 contains nine (3×3) images. For example, if the user selects the upper left image on the first screen 1131, it can be understood that the emotion selected by the user is excited and negative. However, the first screen 1131 fails to show details of the excited and negative emotion, such as anger, fear, or deep sadness. Therefore, if an image related to the excited and negative emotion is selected from the plurality of images on the first screen 1131, the display unit 11 further displays the second screen 1132 on which a plurality of images related to the excited and negative emotion are arranged. The user further selects an image related to his/her emotion from the plurality of images displayed on the second screen 1132, This allows the content providing system to know a detailed user's emotion.

Returning to FIG. 10, in step S6, the communication unit 21 transmits the image data containing the plurality of images acquired by the image acquisition unit 221 to the terminal device 1. In this case, the image data contains display locations of a plurality of images related to the user ID.

In step S7, the communication unit 13 of the terminal device 1 receives the image data transmitted by the server 2.

In step S8, the display controller 141 causes the display unit 11 to display the plurality of images and the first image selection screen through which the user selects an image indicating his/her current emotional state from the plurality of images.

In step S9, the input unit 12 receives the image indicating the user's current emotional state which he/she has selected from the plurality of images through the first image selection screen displayed in the display unit 11.

Figure 17:
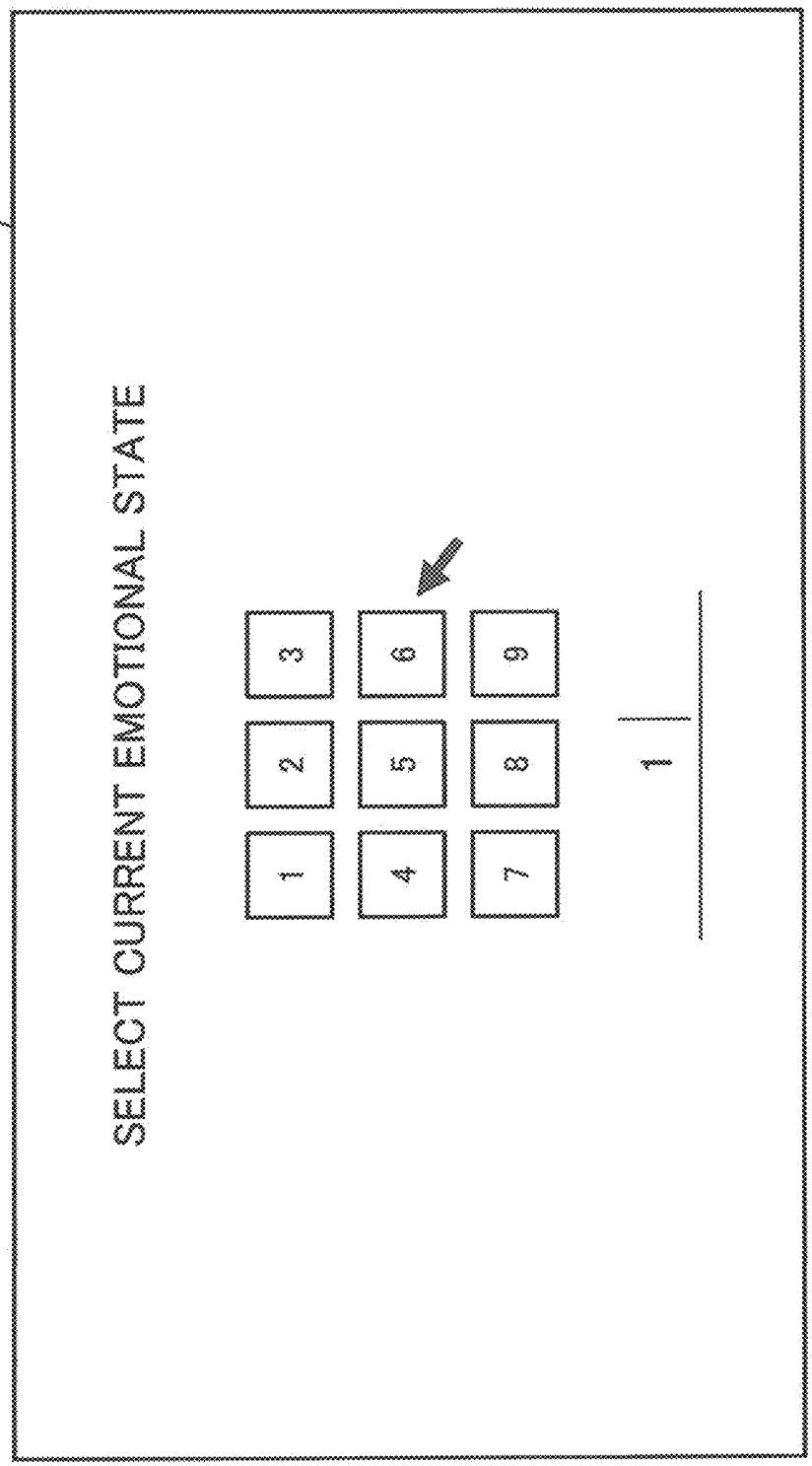
FIG. 17 is a diagram illustrating an example of a first image selection screen displayed in the display unit of the terminal device in the present embodiment.

FIG. 17 is a diagram illustrating an example of the first image selection screen displayed in the display unit of the terminal device in the present embodiment.

The display unit 11 displays the first image selection screen illustrated in FIG. 17. On the first image selection screen illustrated in FIG. 17, a plurality of images are arranged in a selectable manner. By using the input unit 12, the user selects an image indicating his/her current emotional state from the plurality of images. The current emotional state is reference information to be used to select a music content. Therefore, it is desirable for one image to be selected from a plurality of images indicating intuitive information.

Returning to FIG. 10, in step S10, the communication unit 13 transmits, to the server 2, the first image ID related to the image indicating the current emotional state which user has selected by using the input unit 12.

In step S11, the communication unit 21 of the server 2 receives the first image ID transmitted by the terminal device 1.

In step S12, the current emotional state acquisition unit 222 acquires, from the image database storage 231, the intensity of emotion related to the first image ID that the communication unit 21 has received and designates the acquired intensity as the current emotional state.

In step S13, the display controller 141 of the terminal device 1 causes the display unit 11 to display the plurality of images and the second image selection screen through which the user selects, from the plurality of images, an image indicating the user's target emotional state. After acquiring the current emotional state, the display controller 141 causes the display unit 11 to display the plurality of images in a selectable manner.

In step S14, the input unit 12 receives the image indicating the user's target emotional state that the user has selected from the plurality of images through the second image selection screen displayed in the display unit 11.

Figure 18:
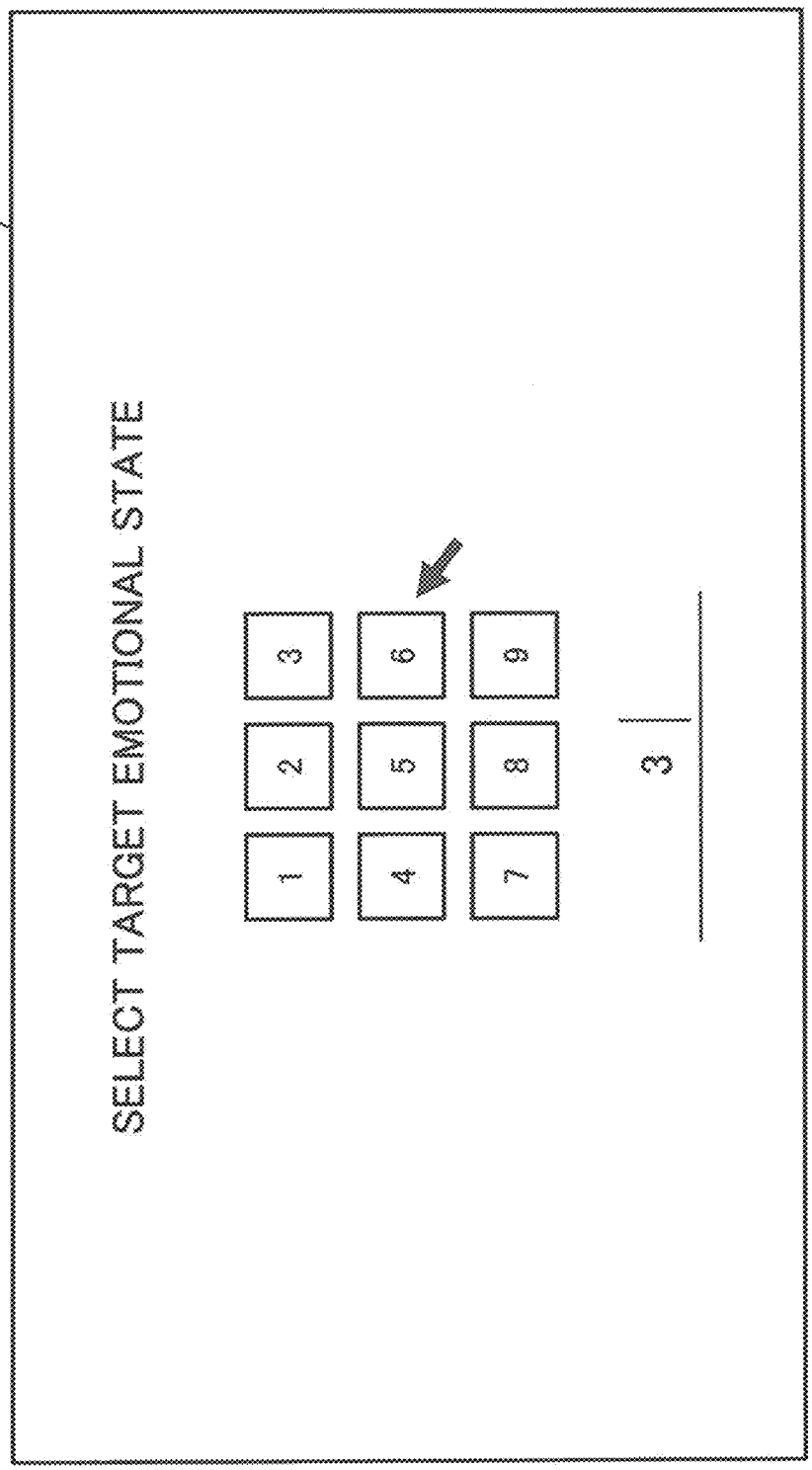
FIG. 18 is a diagram illustrating an example of a second image selection screen displayed in the display unit of the terminal device in the present embodiment.

FIG. 18 is a diagram illustrating an example of the second image selection screen displayed in the display unit of the terminal device in the present embodiment.

The display unit 11 displays the second image selection screen illustrated in FIG. 18. On the second image selection screen illustrated in FIG. 18, a plurality of images are arranged in a selectable manner. By using the input unit 12, the user selects one of the plurality of images which indicates the user's target emotional state.

Returning to FIG. 10, in step S15, the communication unit 13 transmits, to the server 2, the second image ID related to the image indicating the target emotional state that the user has selected by using the input unit 12.

In step S16, the communication unit 21 of the server 2 receives the second image ID transmitted by the terminal device 1.

In step S17, the target emotional state acquisition unit 223 acquires, from the image database storage 231, the intensity of the emotion related to the second image ID received by the communication unit 21. Then, the target emotional state acquisition unit 223 designates the acquired intensity as the target emotional state. The target emotional state acquisition unit 223 acquires the intensity of at least one emotion related to one of the plurality of images which the user has selected and designates the acquired intensity as the target emotional state.

In step S18, the communication unit 21 transmits, to the content providing device 3, the current emotional state acquired by the current emotional state acquisition unit 222 and the target emotional state acquired by the target emotional state acquisition unit 223.

Note that, in the present embodiment, the terminal device 1 individually transmits the first image ID and the second image ID; however, the present disclosure is not particularly limited to this aspect. Alternatively, the terminal device 1 may transmit the first image ID and the second image ID together. In this case, the processes in steps S10 and S1 in FIG. 10 may be unnecessary, and the terminal device 1 may perform the process in step S13 immediately after having performed the process in step S9. Moreover, in step S15, the communication unit 13 may transmit both the first image ID and the second image ID to the server 2. After receiving both the first image ID and the second image ID, the server 2 may perform the processes insteps S12, S17, and S18.

In the present embodiment, the terminal device 1 displays the first image selection screen and then displays the second image selection screen; however, the present disclosure is not particularly limited to this aspect. Alternatively, the terminal device 1 may display a single image selection screen through which the user selects images indicating the user's current emotional state and the user's target emotional state from the plurality of images.

Figure 19:
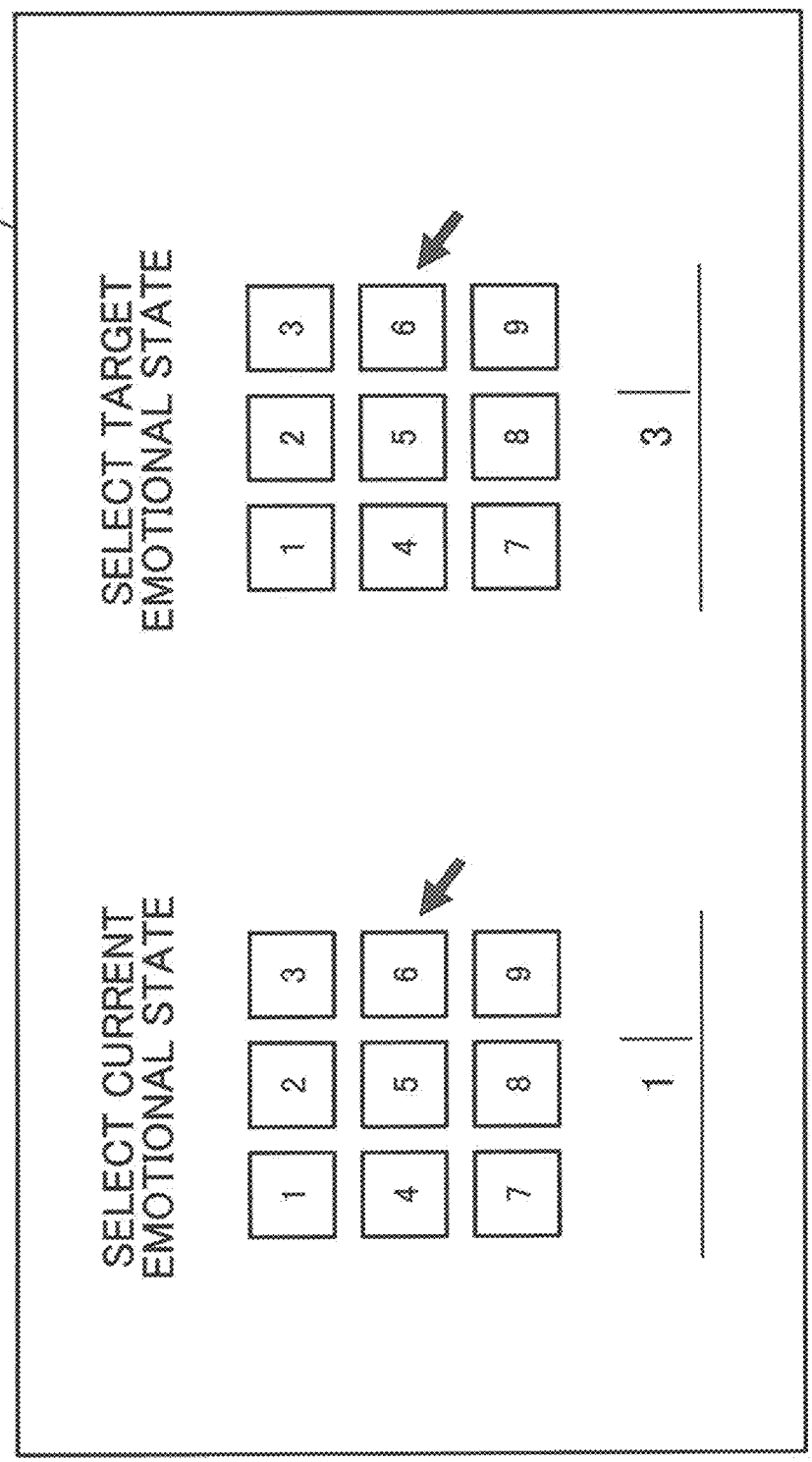
FIG. 19 is a diagram illustrating an example of an image selection screen displayed in the display unit of the terminal device in the present embodiment.

FIG. 19 is a diagram illustrating an example of an image selection screen displayed in the display unit of the terminal device in the present embodiment.

The display unit 11 may display an image selection screen illustrated in FIG. 19. Arranged in a selectable manner on the image selection screen illustrated in FIG. 19 are a first image group from which the user selects an image indicating the current emotional state and a second image group from which the user selects an image indicating a target emotional state. Then, by using the input unit 12, the user selects the image indicating the user's current emotional state from the first image group and the image indicating the user's target emotional state from the second image group.

In the present embodiment, the display unit 11 displays the second image selection screen through which the user selects an image indicating the user's target emotional state from the plurality of images; however, the present disclosure is not limited to this aspect. Alternatively, the display unit 11 may display a coordinate selection screen. Through this coordinate selection screen, the user may select a coordinate point corresponding to the user's target emotional state on a coordinate plane with its horizontal and vertical axes representing the intensities of two emotions.

Figure 20:
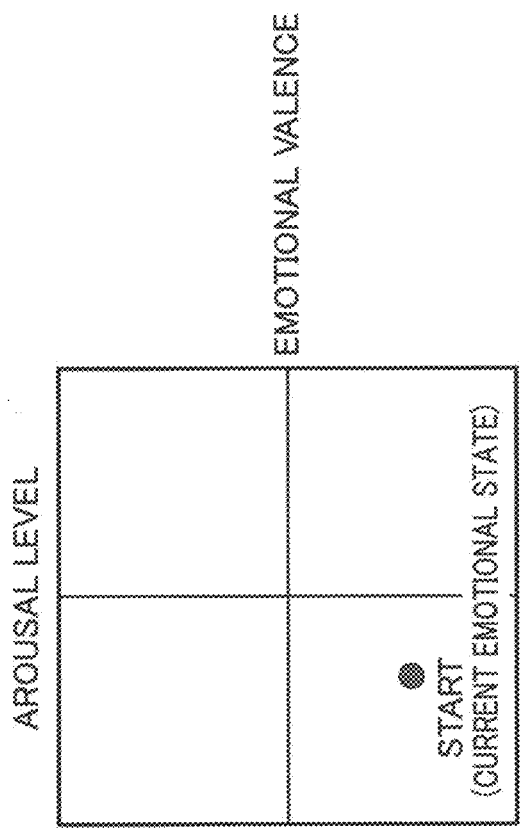
FIG. 20 is a diagram illustrating an example of a coordinate selection screen, in the present embodiment, displayed in the display unit of the terminal device before the user enters a coordinate point corresponding to a target emotional state.
Figure 21:
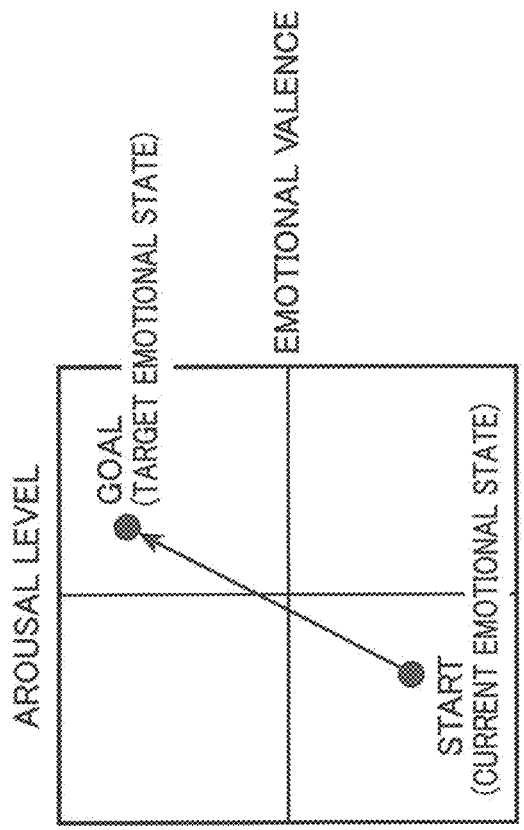
FIG. 21 is a diagram illustrating an example of the coordinate selection screen, in the present embodiment, displayed in the display unit of the terminal device after the user has entered the coordinate point corresponding to the target emotional state.

FIG. 20 is a diagram illustrating an example of the coordinate selection screen, in the present embodiment, displayed in the display unit of the terminal device before the user enters a coordinate point corresponding to the target emotional state. FIG. 21 is a diagram illustrating an example of the coordinate selection screen, in the present embodiment, displayed in the display unit of the terminal device after the user has entered the coordinate point corresponding to the target emotional state.

The display unit 11 may display the coordinate selection screen illustrated in FIG. 20. Displayed on the coordinate selection screen illustrated in FIG. 20 are a coordinate plane with its horizontal and vertical axes representing intensities of two emotions and coordinate points corresponding to the current emotional state. In FIG. 20, the horizontal axis represents the emotional valence, and the vertical axis represents the arousal level. In FIG. 20, a starting point corresponds to the coordinate point corresponding to the current emotional state. The current emotional state is expressed as a coordinate value in the coordinate plane with its horizontal and vertical axes representing the intensities of the two emotions. After acquiring the current emotional state, the display controller 141 causes the display unit 11 to display the coordinate plane together with the coordinate point indicating the current emotional state. Then, by using the input unit 12, the user selects the coordinate point in the coordinate plane which corresponds to the user's target emotional state. The target emotional state acquisition unit 223 of the server 2 acquires the coordinate point in the coordinate plane which corresponds to the target emotional state selected by the user and then designates a coordinate value of the acquired coordinate point as the target emotional state.

After the user has selected the coordinate point corresponding to the target emotional state, the display unit 11 displays the coordinate selection screen illustrated in FIG. 21. Displayed on the coordinate selection screen illustrated in FIG. 21 are the coordinate plane with its horizontal and vertical axes representing the intensities of the two emotions and the coordinate points corresponding to the current emotional state and the target emotional state. In FIG. 21, the horizontal axis represents the emotional valence, and the vertical axis represents the arousal level. In FIG. 21, the starting point indicates the coordinate point corresponding to the current emotional state, and a goal point indicates the coordinate point indicating the target emotional state. Also displayed on the coordinate selection screen is an arrow extending from the starting point to the goal point.

Figure 22:
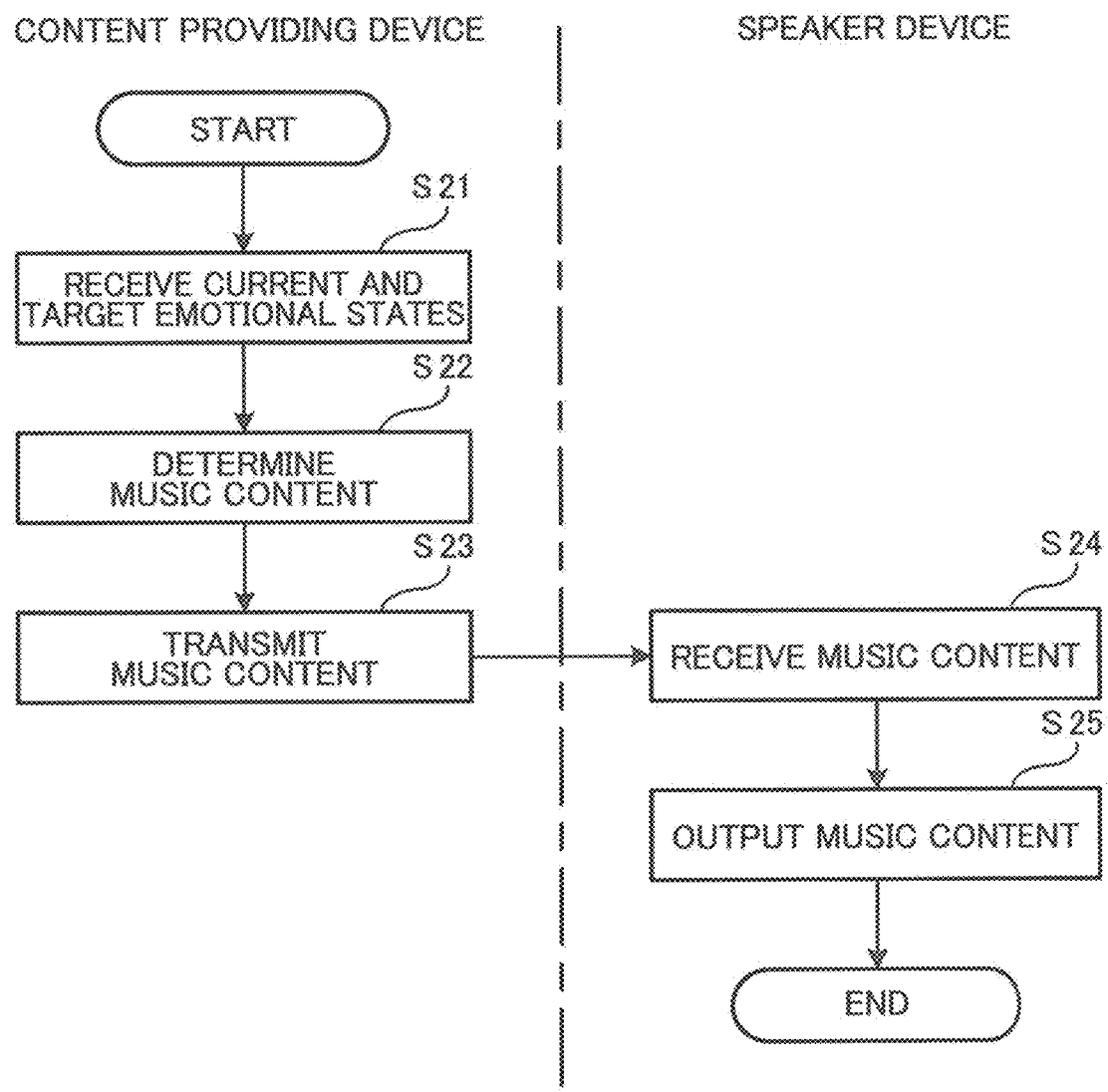
FIG. 22 is a flowchart for use in describing operations of the content providing device and the speaker device in the present embodiment.

FIG. 22 is a flowchart for use in explaining operations of the content providing device and the speaker device, in the present embodiment.

First, in step S21, the communication unit 31 of the content providing device 3 receives the current emotional state and the target emotional state transmitted by the server 2.

In step S22, the music content determination unit 321 determines which music content can change the current emotional state to the target emotional state. The music content determination unit 321 calculates an emotional state change value indicating a difference between the current emotional state and the target emotional state by subtracting the intensity of the emotion indicating the current emotional state from the intensity of the emotion indicating the target emotional state. Then, the music content determination unit 321 acquires the music content related to the calculated emotional state change value from the music content storage 331.

In step S23, the communication unit 31 transmits the music content determined by the music content determination unit 321 to the speaker device 4.

In step S24, the communication unit 41 of the speaker device 4 receives the music content transmitted by the content providing device 3.

In step S25, the music content output controller 421 causes the speaker 43 to output the music content received by the communication unit 41. Then, the user listens to the music content output from the speaker 43. As a result, the user's emotional state changes from the current emotional state to the target emotional state.

During the outputting of the music content, the display unit 11 of the terminal device 1 may display the current emotional state, the target emotional state, and a title of the music content.

Figure 23:
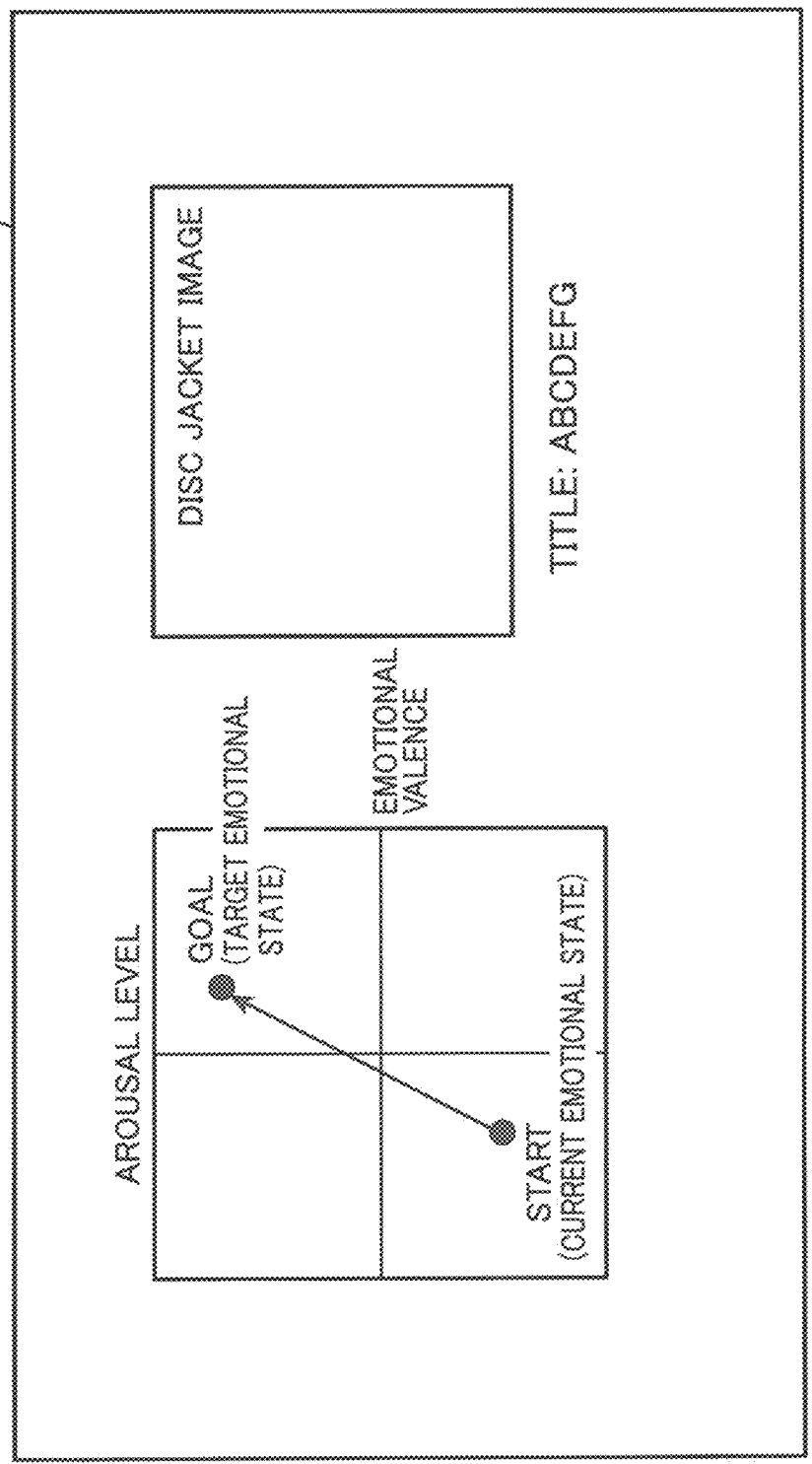
FIG. 23 is a diagram illustrating an example of a content providing screen, in the present embodiment, displayed when an output of a music content is started.
Figure 24:
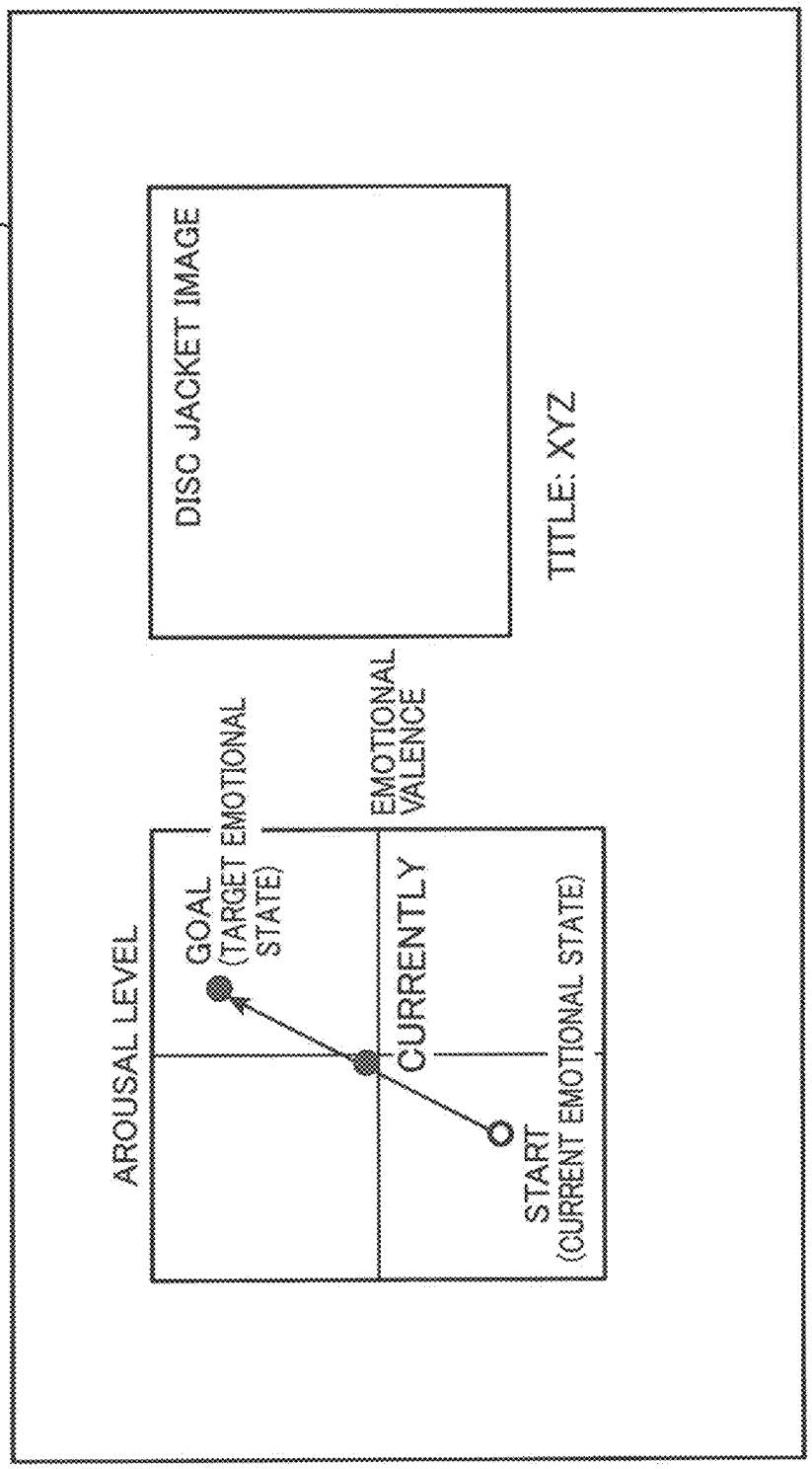
FIG. 24 is a diagram illustrating an example of a content providing screen displayed while the music content is being output in the present embodiment.

FIG. 23 is a diagram illustrating an example of the content providing screen, in the present embodiment, displayed when the output of the music content is started. FIG. 24 is a diagram illustrating content providing screen displayed while the music content is being output in the present embodiment.

The display unit 11 displays a content providing screen illustrated in FIG. 23 when the speaker 43 starts outputting the music content. Displayed on the content providing screen illustrated in FIG. 23 are a coordinate plane with its horizontal and vertical axes representing the intensities of the two emotions, coordinate points corresponding to the current emotional state and the target emotional state, the title of the music content, and a disc jacket image of the music content. In FIG. 23, the horizontal axis represents the emotional valence, and the vertical axis represents the arousal level. In FIG. 23, a starting point indicates a coordinate point corresponding to the current emotional state, and the goal point indicates a coordinate point corresponding to the target emotional state. Also displayed on the coordinate selection screen is an arrow extending from the starting point to the goal point.

The display unit 11 displays a content providing screen illustrated in FIG. 24 during the outputting of the music content. Displayed on the content providing screen illustrated in FIG. 24 are the coordinate plane, the coordinate points corresponding to the current emotional state and the target emotional state, a coordinate point indicating the transition of the user's emotional state, the title of the music content, and the disc jacket image of the music content. In FIG. 24, a current point corresponds to the coordinate point indicating the transition of the user's emotional state while the user is listening to the music content. The coordinates of the current point are calculated based on the time at which the music content is being output and the current time.

In this case, the terminal device 1 receives the current emotional state and the target emotional state from the server 2 and also receives the title of the music content and the disc jacket image of the music content from the content providing device 3. Then, the terminal device 1 creates the content providing screen.

In addition, a questionnaire concerning the music content may be given to user in the same manner as that concerning the image. Then, based on the result of this questionnaire, the content providing device 3 may acquire the emotional state change value related to the music content.

Figure 25:
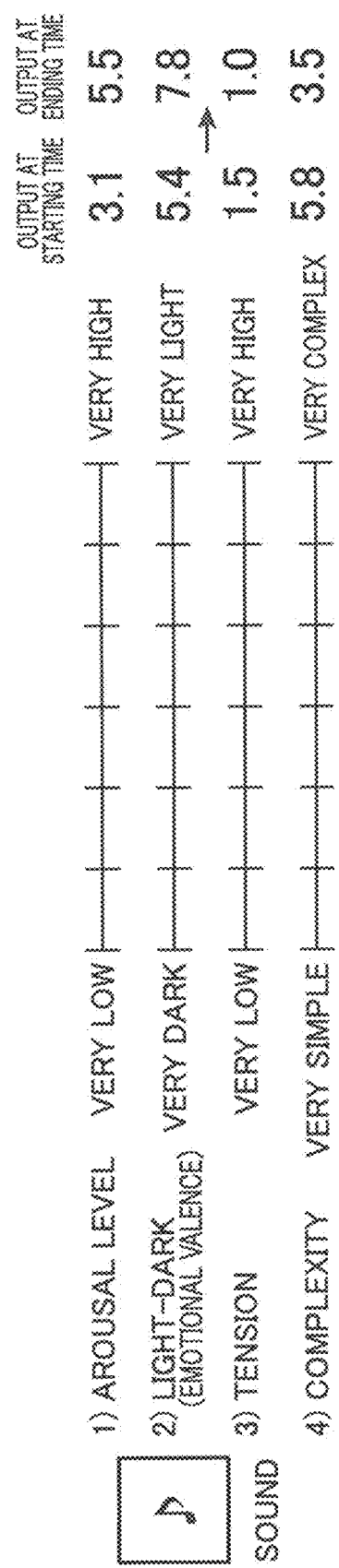
FIG. 25 is a diagram illustrating an example of a questionnaire concerning the music content, in the present embodiment.

FIG. 25 is a diagram illustrating an example of the questionnaire concerning the music content, in the present embodiment.

For example, the speaker device 4 may output one of a plurality of music contents to the user. Then, the terminal device 1 may receive an evaluation of the output music content form the user. Further, the terminal device 1 may receive an evaluation of the output music content from the user within a predetermined time after the outputting of the music content has started (e.g., within 10 seconds after the outputting has started). Alternatively, the terminal device 1 may receive the evaluation of the output music content from the user within a predetermined time after the outputting of the music content has finished (e.g., within the period from 10 seconds before the outputting of the music content has finished to 10 seconds after the outputting of the music content has finished).

The example illustrated in FIG. 25 is the result of a questionnaire given to a plurality of users; this result shows an average of users' evaluations of individual items for a certain music content. In the questionnaire illustrated in FIG. 25, the music content is evaluated for four emotions: the arousal level, the light-dark (emotional valence), the tension, and the complexity. Each emotion is evaluated on a scale of one to seven.

In FIG. 25, at the time of starting outputting the music content, the evaluation of the arousal level is 3.1 on average, the evaluation of the light-dark (emotional valence) is 5.4 on average, the evaluation of the tension is 1.5 on average, and the evaluation of the complexity is 5.8 on average. At the time of finishing outputting the music content, the evaluation of the arousal level is 5.5 on average, the evaluation of the light-dark (emotional valence) is 7.8 on average, the evaluation of the tension is 1.0 on average, and the evaluation of the complexity is 3.5 on average. By subtracting the evaluation value of each emotion at the start of the outputting from the evaluation value of each emotion at the end, the music content determination unit 321 calculates the emotional state change value of each emotion. The emotional state change value is normalized to a value ranging from −1.0 to +1.0 and is related to the music content.

(Modification)

Next, some modifications of the present embodiment will be described below.

(1) When the user selects an image, the terminal device 1 may switch its display aspect by selectively displaying a plurality of images that indicate intensities of an emotion on a single axis or displaying a plurality of images that indicate intensities of a plurality of emotions on multiple axes. For example, the terminal device 1 may switch the displaying aspect, depending on where the user is present.

For example, when the user uses the content providing system in the bedroom before going to bed, he/she expects that a music content to be output is a quiet one. In this case, the terminal device 1 may display a plurality of images on a single emotion axis. For example, the terminal device 1 may display a plurality of images on an axis representing the emotional valence. The terminal device 1 may allow the user to determine whether to display a plurality of images related to a negative or positive emotion.

If the terminal device 1 judges that the user cancels music contents at least a predetermined number of times within a predetermined time after the first music content has been output based on the user's usage information, the terminal device 1 may change a plurality of images in order to accurately acquire information on the emotional valence. For example, the terminal device 1 may display a screen through which the user determines whether to display a plurality of images related to a negative or positive emotional valence. Then, the terminal device 1 may display the plurality of images indicating any of the negative and positive emotional valences in accordance with the user's selection.

If the terminal device 1 judges that the user cancels music contents at least a predetermined number of times within a predetermined time after the first music content has been output based on the user's usage information, the terminal device 1 may display a plurality of images related to another emotion. If the user cancels music contents that have been determined based on the emotional valence at least a predetermined number of times within a predetermined time after the first music content has started, the terminal device 1 may display a plurality of images related to the complexity or the stress. For example, if the user cancels a music content after the terminal device 1 has acquired the intensity of an emotion on a single axis, the terminal device 1 may acquire the intensity of another emotion on a single axis.

For example, when the user who is relaxed in a living room uses the content providing system, the user is expected to be in the mood for being ready to select a music content in detail. In this case, the terminal device 1 may display a plurality of images on two emotion axes from the beginning. For example, the terminal device 1 may display a plurality of images through which the user selects the arousal level, the emotional valence, the tension, and the complexity in this order.

The current time may be acquired via the Internet or from a clock provided in the content providing device 3 or the terminal device 1. The terminal device 1 may memorize in advance a location at which the terminal device 1 is disposed and identify the location of the terminal device 1 (user) by referring to the memorized location.

(2) The terminal device 1 may acquire a detailed current emotional state or target emotional state in accordance with a user's situation. For example, if the user uses the content providing system in a time zone before the user goes to bed, the terminal device 1 may display a screen through which the user determines whether to display a plurality of images related to a positive or negative emotional valence. Then, the terminal device 1 may display the plurality of images indicating any of the negative and positive emotional valences in accordance with the user's selection. The plurality of images may be three images, for example.

(3) The terminal device 1 may change the number of emotions to be acquired as the current emotional state or the target emotional state, based on a selection time lasting from when a plurality of images are displayed until one of the images is selected by the user. Beginners may need a long selection time because of their unfamiliarity, but the selection time is shortened as their maturity increases. For example, if the selection time is shorter than a predetermined threshold time, the terminal device 1 may increase the number of emotion axes displayed in order to acquire a more detailed emotional state.

The display controller 141 of the terminal device 1 may display a plurality of images in relation to the intensity of a first emotion. The processor 14 of the terminal device 1 may include a time measuring unit that measures the selection time from when a plurality of images are displayed until one of the image is selected by the user. If the measured selection time is equal to or shorter than the predetermined time, the display controller 141 may display a plurality of images in a selectable manner, in relation to the intensity of a second emotion, which differs from the intensity of the first emotion.

First the server 2 may acquire the intensities of emotions on two axes as the current emotional state or the target emotional state, and then increases the number of emotion axes as the selection time is shortened. The terminal device 1 may divide one screen into a plurality of screens and display a plurality of images related to respective emotions on each screen. The server 2 may acquire the intensities of one or two emotions through a first screen on which a plurality of images are related to emotions on one or two axes. Then, the server 2 may acquire the intensities of one or more emotions through a second screen on which a plurality of images are related to emotions on one or two emotion axes that are different from the emotions in the first screen.

The threshold for the selection time may be set based on a user's past selection time. For example, if the difference between the average of five past selection times acquired before the plurality of images are displayed and the average of the past ten selection times acquired before the plurality of images are displayed is shorter than a predetermined time, the terminal device 1 may determine that the maturity has increased and then may increase the number of axes representing emotions to be acquired. Alternatively, the terminal device 1 may use the difference between the averages of selection times that have been taken one to five times before and six to ten times before.

The terminal device 1 may display a selection button on the second screen which indicates that the number of emotions axes does not increase. If the selection time on the second screen is equal to or longer than the predetermined time and the user cancels music contents at least the predetermined number of times, the terminal device 1 may stop displaying the second screen, in other words, may display only the first screen.

If the user presses the selection button on the second screen which indicates that the number of emotion axes does not increase, the terminal device 1 no longer has to display the second screen when acquiring the current emotional state or the target emotional state. If the terminal device 1 acquires the current emotional state or the target emotional state without displaying the second screen and the user cancels a music content at least the predetermined number of times, the terminal device 1 displays, together with the second screen, a message indicating that a music content suitable for the user can be output if the user selects an image through the second screen.

(4) In consideration of the history of past current emotional states or past target emotional states, a high priority may be assigned to an acquired emotion whose intensity value has greatly changed, whereas a low priority may be assigned to an acquired emotion whose intensity has not greatly changed. The memory 23 of the server 2 may store the history of acquired current emotional states. If the difference in intensity between the current emotional states acquired previously and two times before is equal to or greater than a threshold, the image acquisition unit 221 may assign a high priority to an intensity of a corresponding emotion. The image acquisition unit 221 may acquire a plurality of images related to the intensities of the emotion to which a high priority has been assigned. The display controller 141 of the terminal device 1 may sequentially display a plurality of images related to the intensities of the emotion to which a high priority is assigned.

For example, when acquiring intensities of a plurality of emotions, the terminal device 1 may preferentially display a plurality of images related to an emotion to which a high priority is assigned. When acquiring intensities of a plurality of emotions by displaying a plurality of images for each emotion axis, the terminal device 1 may sequentially display a plurality of images related to the emotion to which a high priority is assigned.

When displaying a plurality of images both on two emotion axes and on one emotion axis, the terminal device 1 may display the plurality of images on the two emotion axes to which the highest and the second highest priorities are assigned and may further display the plurality of images on the emotion axis to which the third highest priority is assigned. Alternatively, the terminal device 1 first may display the plurality of images on two emotion axes to which the highest and second highest priorities are assigned and then may further display the plurality of images on the emotion axes to which the highest and third highest priorities are assigned.

If the intensity value of an emotion acquired varies by less than or equal to a predetermined amount, the server 2 may acquire the current emotional state or the target emotional state based on the history of the past selection without allowing the user to select an image. To determine the intensity value of an emotion acquired varies by less than or equal to a predetermined amount, the difference between the intensity of the emotion acquired and the average of the intensities of emotions to which the selected image is related can be used. Alternatively, to determine the intensity of an emotion acquired varies by less than or equal to a predetermined amount, a variance value can be used.

It is preferable that the change in the intensity value of the emotion acquired be used in accordance with a time zone. The setting of the emotion axis in accordance with the time zone is effective because this setting conforms to a user's action without being based on the past history. For example, the user is likely to be sleepy in a time zone immediately before he/she goes to bed. Therefore, the server 2 acquires an intensity of an emotion on an axis representing the tension or the stress and does not acquire an intensity of an emotion on an axis representing the arousal level.

Intensity values of the emotion acquired may be compared every time at least one of the current emotional state and the target emotional state is acquired.

(5) The emotional state indicated by the selected image may be compensated for in accordance with person's characteristics. The processor 22 of the server 2 may further include a compensation unit that compensates for the acquired current emotional state, based on the current time and the features of the selected image. This compensation unit may also compensate for the acquired target emotional state, based on the current time and the features of the selected image. FIG. 26 is a diagram for use in describing how to compensate for the arousal level, in the present embodiment.

The compensation unit acquires time information, such as the time at which the image has been selected by the user, and based on the acquired time information and the features of the selected image, compensates for the value of the current emotional state or the target emotional state. For example, it is said that a person's vision for colors changes with a time zone. For example, it is said that a person can clearly see a blue color at night. Therefore, if the current time (the time at which the image has been selected by the user) is in the nighttime zone and the hue of the selected image is blue (e.g., 180° to 240°), the compensation unit may increase the value of the arousal level by 20%, for example.

In the example of FIG. 26, if the current time is in the nighttime zone, the compensation unit may compensate for the value of the arousal level for the selected image with the image ID "7788" from "+0.1" to "+0.12" because first image features, or hue, is 185°.

The music content determination unit 321 may determine a music content in accordance with parson's characteristics. It is said that a person feels the passage of the time differently, depending on a time zone. For example, it is said that a person feels a tempo of a sound is faster at night than that in the day time even if the sound is the same music. Therefore, if the current time is in the nighttime zone, the music content determination unit 321 may select a music content whose tempo is slower by 20%, for example, than that of a music content related to the calculated emotional state change value.

(6) The compensation unit may compensate for the emotional state to which the selected image is related, in accordance with users biometric information acquired upon the selection of the image. The content providing system may further include a biometric information measuring device that measures the user's biometric information. The biometric information may be a heart rate, for example. The communication unit 21 of the server 2 may acquire the user's biometric information from the biometric information measuring device. The processor 22 of the server 2 may further include another compensation unit that compensates for the acquired current emotional state, based on the acquired biometric information. For example, when the acquired heart rate is equal to or more than a predetermined value, the compensation unit may increase, by 20%, the value of the arousal level of the current emotional state.

The compensation unit may compensate for the acquired target emotional state, based on the acquired biometric information. In this case, for example, when the acquired heart rate is equal to or more than the predetermined value, the compensation unit may increase, by 20%, the value of the arousal level of the target emotional state.

It is said that when listening to music with his/her heart rate being high, a person feels that the tempo is slower than usual. Therefore, the music content determination unit 321 may determine the music content in accordance with the user's biometric information.

Figure 27:
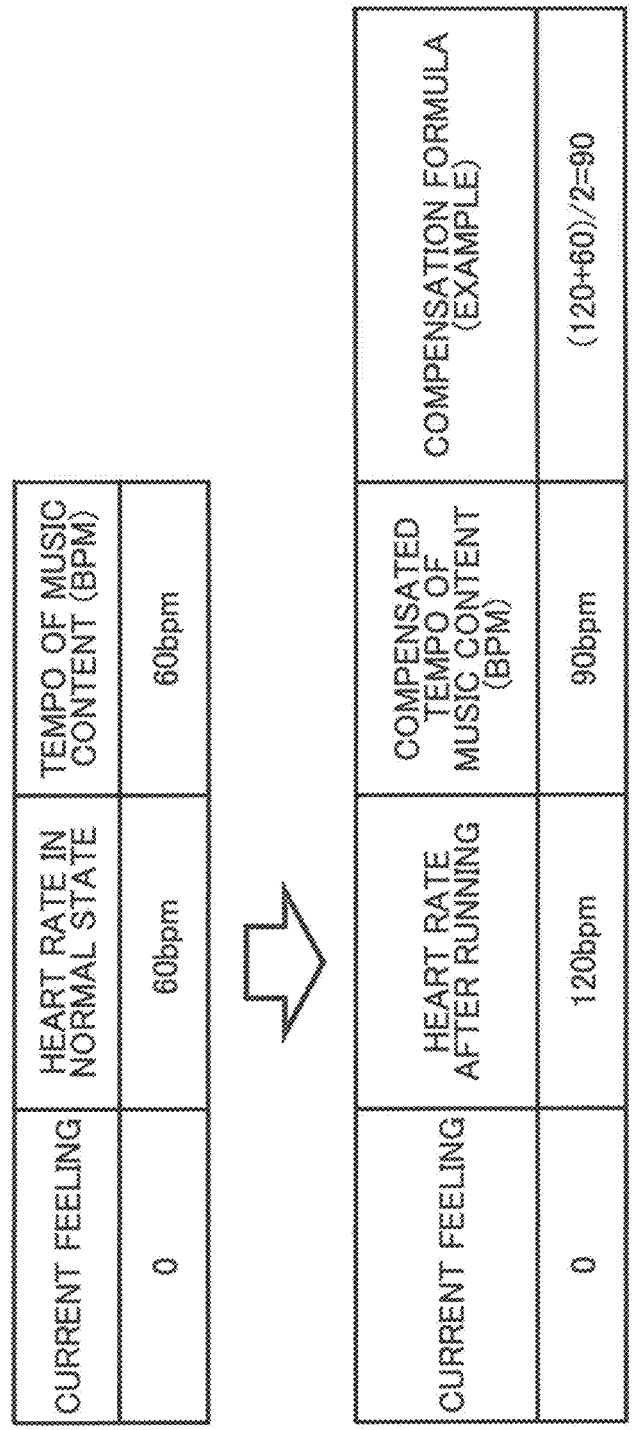
FIG. 27 is a diagram for use in describing how to determine the music content in accordance with user's biometric information, in the present embodiment.

FIG. 27 is a diagram for use in describing how to determinate the music content in accordance with the user's biometric information, in the present embodiment.

When the user is in a normal state, in other words, when his/her current feeling (arousal level) is "0", his/her heart rate is 60 bpm. In this case, a music content representing the user's current feeling (arousal level) can have a tempo of 60 bpm. If the user's current feeling (arousal level) is "0" after the user has run, his/her heart rate can be 120 bpm. In this case, the user's current feeling (arousal level) is "0". Thus, if listening to a music content having a tempo of 60 bpm, the user feels that the music content of a lower arousal level is being played. For this reason, the music content determination unit 321 preferably compensates for the tempo of the music content in accordance with the user's biometric information (e.g., heart rate). As demonstrated by the compensation formula of FIG. 27, the music content determination unit 321 may determine a value (90 bpm) by adding a normal heart rate of 60 bpm to a current heart rate of 120 bpm measured after the user has run and by dividing the resultant value by two. Then, the music content determination unit 321 may designate the determined value (90 bpm) as the tempo of the compensated music content. In this way, it is possible to provide a music content having a tempo that matches user's current feeling (arousal level).

Alternatively, the current emotional state acquisition unit 222 may compensate for the intensity of the current emotional state in accordance with the user's heart rate. If the heart rate is a normal value such as 60 bpm at the time of acquiring the arousal level (e.g., "0"), the current emotional state acquisition unit 222 may acquire the arousal level without making any compensation. If the heart rate is higher than a predetermined value at the time of acquiring the arousal level (e.g., "0"), the current emotional state acquisition unit 222 may compensate for the arousal level so as to increase by +0.5, for example. The current emotional state acquisition unit 222 may determine the compensation value in accordance with the current value of the heart rate. In addition, if the current heart rate falls within a predetermined range, the current emotional state acquisition unit 222 may subtract a predetermined value from the acquired arousal level.

The target emotional state acquisition unit 223 may compensate for the intensity of the target emotional state in accordance with the user's heart rate. However, the target emotional state acquisition unit 223 does not necessarily have to compensate for the intensity of the target emotional state in accordance with the user's heart rate. In this case, the target emotional state acquisition unit 223 may compensate for only the intensity of the current emotional state in accordance with the user's heart rate.

The music content output controller 421 may output the music content at the compensated tempo (e.g., 90 bpm) at the beginning and then gradually decrease the tempo with time. At the end of the outputting, the music content output controller 421 may output the music content at a normal tempo (e.g., 60 bpm). Gradually decreasing the tempo in this manner can effectively control the user's emotion.

(7) The plurality of images may be created by visualizing a result of analyzing music data. For example, a plurality of two-dimensional images that visualize characteristics of various music data may be created by a recurrence plot, which is one technique of nonlinear time series analysis.

Figure 28:
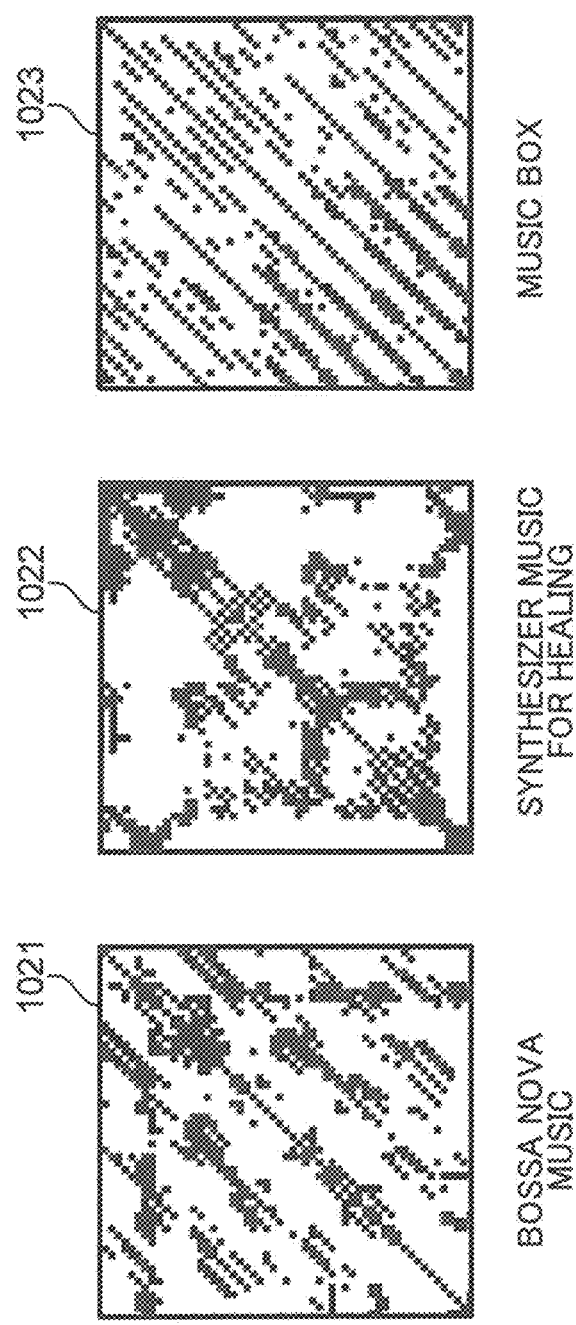
FIG. 28 is a diagram illustrating an example of a plurality of images each created by a recurrence plot in the present embodiment.

FIG. 28 is a diagram illustrating an example of a plurality of images each created by the recurrence plot in the present embodiment.

In FIG. 28, an image 1021 is an image created as a result of analyzing a bossa nova music with the hierarchical recurrence plot; an image 1022 is an image created as a result of analyzing a synthesizer music for healing with the hierarchical recurrence plot; and an image 1023 is an image created as a result of analyzing a music box with the hierarchical recurrence plot. Each image may contain a color that expresses an emotion. The hierarchical recurrence plot is disclosed in "Miwa Fukino, Yoshito Hirata and Kazuyuki Aihara, "Coarse-graining time series data: recurrence plot of recurrence plots and its application for music," Chaos: An Interdisciplinary Journal of Nonlinear Science, (2016)", and thus details will not be described.

Analyzing various music data with the recurrence plot in this manner can easily create a plurality of images.

(8) In the present embodiment, the terminal device 1 may incorporate some or all of the configurations of at least one of the server 2, the content providing device 3, and the speaker device 4.

Figure 29:
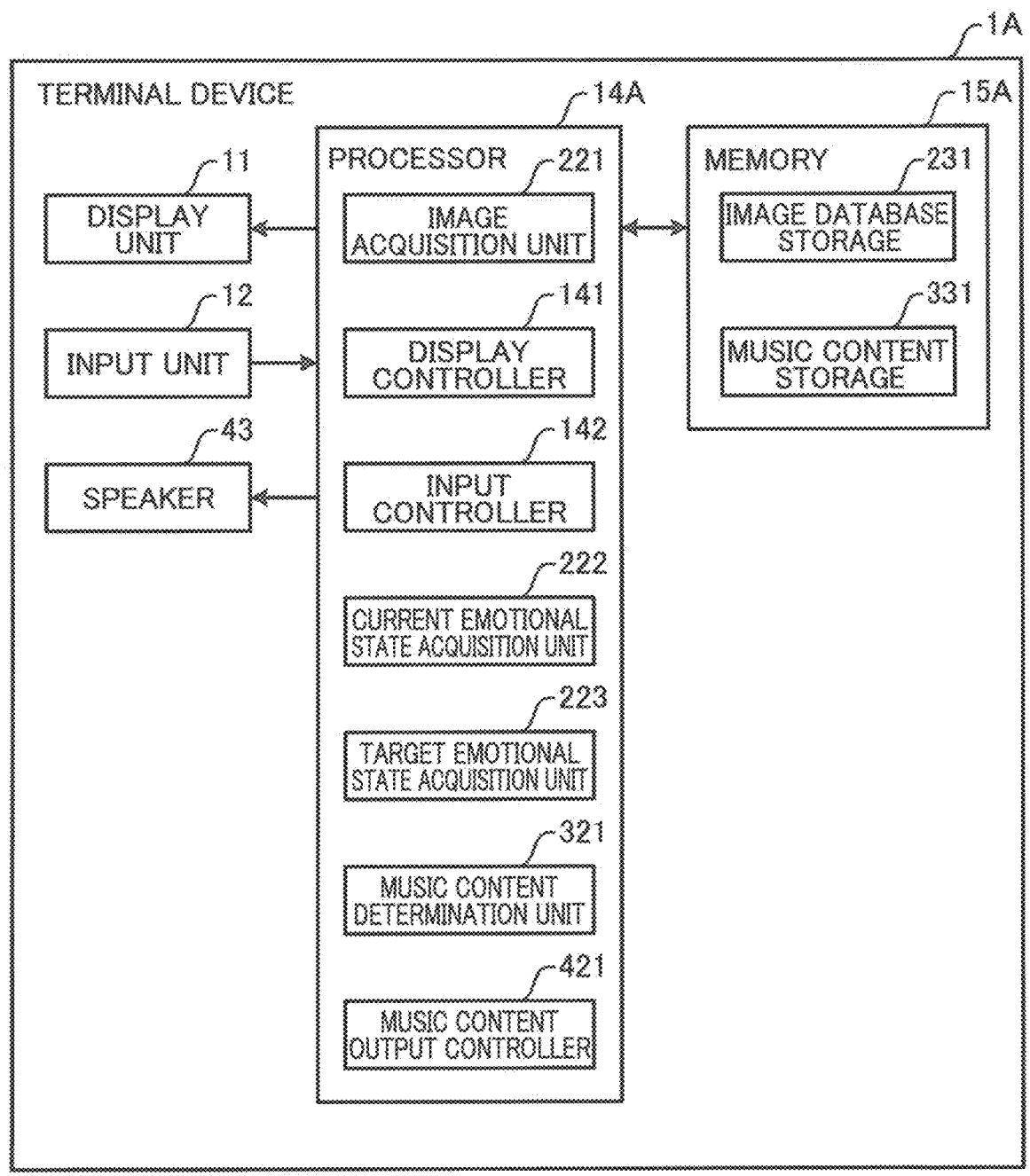
FIG. 29 is a block diagram illustrating an example of a configuration of a terminal device according to a modification of the embodiment of the present disclosure.

FIG. 29 is a block diagram illustrating an example of a configuration of a terminal device according to a modification of the embodiment of the present disclosure.

The terminal device 1A illustrated in FIG. 29 includes a display unit 11, an input unit 12, a processor 14A, a memory 15A, and a speaker 43. The processor 14A includes a display controller 141, an input controller 142, an image acquisition unit 221, a current emotional state acquisition unit 222, a target emotional state acquisition unit 223, a music content determination unit 321, and a music content output controller 421. The memory 15A includes an image database storage 231 and a music content storage 331. In FIG. 29, the components in the terminal device 1A which are identical to those in the terminal device 1, the server 2, the content providing device 3, and the speaker device 4 in the foregoing embodiment are given the same reference numbers and will not be described.

SUMMARY

In the present embodiment, the content providing system provides nine (3×3) images roughly (or broadly) expressing emotions. When the user selects one of the images, the content providing system further provides nine (3×3) images expressing detailed emotions related to the selected image. Then, the user selects one of the images again. Through this selecting operation, the content providing system can acquire a user's detailed emotion from the image selected by the user. During this selecting operation, the content providing system can compensate for the difference between an expected emotion indicated by the system and an emotion received by the user.

If the display unit 11 has a sufficiently large screen, the display controller 141 may display 81 (9×9) images at one time. However, if the display unit 11 has a small screen, the display controller 141 may display 81 (9×9) images separately. More specifically, the display controller 141 may first display nine (3×3) images and, after the image has selected one of the nine (3×3) images, may display the remaining nine (3×3) images. This makes it possible to increase the visibility of the images without changing the number of images that are related to emotions and stored in the content providing system.

The content providing system provides two or more emotion axes and allows the user to individually select these axes. The content providing system thereby can find and add a new axis that cannot be expressed by a Russell-based, two-axis map, through machine learning. Consequently, the content providing system provides a user-interface design that will be expandable in the future. For example, when the content providing system needs to express the emotion of a user who is very sensitive to a high-pitched metallic sound (a high-pitched sound), it is difficult to express a pitch difference on a conventional two-axis map. However, if the content providing system can discriminate sounds having different pitches through the machine learning, it creates a plurality of images expressing a pitch difference by analyzing a plurality of sounds with different pitches with the recurrence plots. Then, the content providing system provides the created images to the user, thereby successfully achieving an input interface for an emotion which considers individual differences.

In the foregoing embodiment and modifications, each of the components may be implemented by dedicated hardware or by executing a suitable software program. Each component may be implemented by a program execution unit, such as a CPU or a processor, reading and executing a software program recorded in a hard disk, a semiconductor memory, or other recording medium.

Some or all of the functions of the devices according to the embodiment of the present disclosure may be typically implemented by an integrated circuit (IC), more specifically, a large scale integrated circuit (LSI). Each or all of those functions may be integrated by a single chip. However, the IC is not limited to an LSI and may be realized by a dedicated circuit or a general-purpose processor. A field programmable gate array (FPGA) that is programmable after the LSI has been manufactured or a reconfigurable processor that can change connections between and setting of internal circuit cells may be used.

Alternatively, some or all of the functions of the device according to the embodiment of the present disclosure may be implemented by a processor, such as a CPU, executing a program.

The numbers used above are merely examples used to specifically describe the present disclosure and thus are not intended to limit the present disclosure.

The sequence in which the steps described in the above flowcharts are performed is merely an example used to specifically describe the present disclosure, and may be changed as long as it is possible to produce similar effects. Further, some of the above steps may be executed simultaneously (in parallel) with others.

The technique according to the present disclosure allows the user to sensuously select his/her emotional state and can easily identify a user's current emotional state from an image selected by the user. Thus, this technique is applicable to systems that change users' emotional state by using contents.

This application is based on U.S. provisional application No. 62/858,020 filed in the United States Patent and Trademark Office on Jun. 6, 2019 and Japanese Patent application No. 2019-179541 filed in Japan Patent Office on Sep. 30, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A content selection method using a computer, comprising: acquiring a plurality of images related to intensities of at least one emotion, wherein the intensities are based on determined values of selectable criteria, which include arousal level, emotional valence, tension, complexity, and stress;
displaying the plurality of images in a selectable manner in a display, wherein the displaying of the plurality of images includes displaying a plurality of images related to intensities of a first emotion;
acquiring an intensity of the first emotion to which an image that a user has selected from the plurality of images related to intensities of the first emotion, and designating the acquired intensity as a current emotional state that indicates a user's current emotional state;
measuring a selection time lasting from when the plurality of images are displayed until the image is selected by the user;
in response to the selection, displaying, in a selectable manner, a second plurality of images related to intensities of a second emotion only when the measured selection time is shorter than or equal to a predetermined time, the second emotion differing from the first emotion;
in response to a selection of the second emotion, acquiring a target emotional state that indicates an emotional state that the user has set as a target;
determining a content to be used to change the current emotional state to the target emotional state; and
outputting the content.

2. The content selection method according to claim 1, further comprising: acquiring user identification information to be used to identify the user,
wherein the acquiring of the plurality of images includes acquiring the plurality of images related in advance to the user identification information.

3. The content selection method according to claim 1, further comprising: displaying the plurality of images in a selectable manner in the display after the acquiring of the current emotional state has been performed,
wherein the acquiring of the target emotional state includes acquiring an intensity of the at least one emotion to which the image that the user has selected from the plurality of images is related and designating the acquired intensity as the target emotional state.

4. The content selection method according to claim 1, wherein the current emotional state is expressed as a coordinate value in a coordinate plane with a horizontal axis and a vertical axis representing intensities of respective emotions,
the content selection method further comprising:
displaying the coordinate plane in the display together with a coordinate point corresponding to the current emotional state after the acquiring of the current emotional state has been performed,
wherein the acquiring of the target emotional state includes acquiring a coordinate value of a coordinate point corresponding to the target emotional state that the user has selected through the coordinate plane and designating the acquired coordinate value as the target emotional state.

5. The content selection method according to claim 1, further comprising:
storing a history of the acquired current emotional state; and
assigning a high priority to the intensity of the emotion when a difference between intensities of the emotion in the current emotional state which have been acquired previously and two times before is equal to or greater than a threshold,
wherein the displaying of the plurality of images includes sequentially displaying a plurality of images related to intensities of the emotion to which the high priority is assigned.

6. The content selection method according to claim 1, further comprising: compensating for the acquired current emotional state, based on a current time and features of the selected image.

7. The content selection method according to claim 1, further comprising: acquiring biometric information from the user; and
compensating for the acquired current emotional state, based on the acquired biometric information.

8. A content selection device, comprising:
a processor;
a memory;
a display;
and a transmitter/receiver configured to execute operations, including
acquiring a plurality of images related to intensities of at least one emotion, wherein the intensities are based on determined values of selectable criteria, which include arousal level, emotional valence, tension, complexity, and stress;
displaying the plurality of images in a selectable manner in a display, wherein the displaying of the plurality of images includes displaying a plurality of images related to intensities of a first emotion;
acquiring an intensity of the first emotion to which an image that the user has selected from the plurality of images related to intensities of the first emotion, and designating the acquired intensity as a current emotional state that indicates a user's current emotional state;
measuring a selection time lasting from when the plurality of images are displayed until the image is selected by the user;
in response to the selection, displaying, in a selectable manner, a second plurality of images related to intensities of a second emotion only when the measured selection time is shorter than or equal to a predetermined time, the second emotion differing from the first emotion;
in response to a selection of the second emotion, acquiring a target emotional state that indicates an emotional state that the user has set as a target;
determining a content to be used to change the current emotional state to the target emotional state; and
outputting the content.

9. A non-transitory computer-readable recording medium that stores a content selection program that causes a computer to perform: acquiring a plurality of images related to intensities of at least one emotion, wherein the intensities are based on determined values of selectable criteria, which include arousal level, emotional valence, tension, complexity, and stress;
- displaying the plurality of images in a selectable manner in a display, wherein the displaying of the plurality of images includes displaying a plurality of images related to intensities of a first emotion;
- acquiring an intensity of the first emotion to which an image that a user has selected from the plurality of images related to intensities of the first emotion, and designating the acquired intensity as a current emotional state that indicates a user's current emotional state;
- measuring a selection time lasting from when the plurality of images are displayed until the image is selected by the user;
- in response to the selection, displaying, in a selectable manner, a second plurality of images related to intensities of a second emotion only when the measured selection time is shorter than or equal to a predetermined time, the second emotion differing from the first emotion;
- in response to a selection of the second emotion, acquiring a target emotional state that indicates an emotional state that the user has set as a target;
- determining a content to be used to change the current emotional state to the target emotional state; and
- outputting the content.

* * * * *